(12) United States Patent
Gliksberg

(10) Patent No.: US 12,158,766 B2
(45) Date of Patent: Dec. 3, 2024

(54) REAL-TIME AUTONOMOUS SWARMS CONDUCT AND ORCHESTRATION

(71) Applicant: NAVIGATE LTD., Bazra (IL)

(72) Inventor: Baruch Gliksberg, Bazra (IL)

(73) Assignee: NAVIGATE LTD., Bazra (IL)

( * ) Notice: Subject to any disclaimer, the term of this patent is extended or adjusted under 35 U.S.C. 154(b) by 0 days.

(21) Appl. No.: 18/595,390

(22) Filed: Mar. 4, 2024

(65) Prior Publication Data
US 2024/0370037 A1 Nov. 7, 2024

(30) Foreign Application Priority Data
May 3, 2023 (IL) .......................................... 302627

(51) Int. Cl.
*G05D 1/698* (2024.01)
*G05D 1/226* (2024.01)
*G05D 109/25* (2024.01)

(52) U.S. Cl.
CPC ......... *G05D 1/6983* (2024.01); *G05D 1/2265* (2024.01); *G05D 2109/254* (2024.01)

(58) Field of Classification Search
None
See application file for complete search history.

(56) References Cited

U.S. PATENT DOCUMENTS

| | | | |
|---|---|---|---|
| 9,208,462 | B2 | 12/2015 | Arunachalam et al. |
| 10,937,324 | B2 | 3/2021 | Vaughan et al. |
| 2015/0338855 | A1 | 11/2015 | Stark et al. |
| 2019/0392717 | A1 | 12/2019 | Vaughn et al. |
| 2020/0233411 | A1* | 7/2020 | Ivanov ................. G05D 1/0027 |
| 2022/0365721 | A1 | 11/2022 | Pabón et al. |
| 2022/0399936 | A1 | 12/2022 | Arksey et al. |

FOREIGN PATENT DOCUMENTS

WO 2022/029196 A1 2/2022

OTHER PUBLICATIONS

Dias et al., "Swarm Robotics: A Perspective on the Latest Reviewed Concepts and Applications", Sensors, Mar. 15, 2021, pp. 1-31 ( Year: 2021).*
Rahbari et al., "Fast and Fair Computation Offloading Management in a Swarm of Drones Using a Rating-Based Federated Learning Approach", IEEE Access, Aug. 20, 2021, pp. 113832-113849 (Year: 2021).*

* cited by examiner

*Primary Examiner* — Tamara L Weber
(74) *Attorney, Agent, or Firm* — The Roy Gross Law Firm, LLC; Roy Gross

(57) ABSTRACT

The present invention discloses systems, modules and methods for an autonomous orchestrion of at least one first swarm, comprising offline model-based subsystem for pre-computation of swarm strategies to be performed at real-time; and a real-time subsystem intercommunicated with the offline pre-commutating subsystem.

20 Claims, 6 Drawing Sheets

REAL-TIME AUTONOMOUS SWARMS CONDUCT AND ORCHESTRATION

CROSS REFERENCE TO RELATED APPLICATIONS

This application claims priority from Israel Pat. Appl. No. 302627, filed 3 May 2023, the contents of which are hereby incorporated by reference in their entirety.

FIELD OF THE INVENTION

The present invention pertains to means and methods for real-time autonomous swarms conduct and orchestration.

BACKGROUND OF THE INVENTION

Autonomous robots, which may also be referred to or include drones, unmanned aerial vehicles, and the likes, are vehicles that operate partially or fully without human direction.

Autonomous robots use geo-positioning for a variety of purposes including navigation, mapping, and surveillance. U.S. Ser. No. 10/937,324 discloses a mechanism to orchestrate and to coordinate drone swarms, where the focus is on an individual drone that performs coordination with other swarm-member drones so as to maximize its objective. A long-felt need are means and methods for real-time autonomous non-coordinated swarm conduct and orchestration where the pith-and-marrow is the maximization of short-term and near real-time swarm objectives, and not of fulfilling objectives of an individual drone.

Objects in swarms, like drones, autonomous cars, robots, and others may require extremely rapid processing, for which solution may lay in the field of compliance monitoring event-based driving of an orchestrator by a storage system, see US20220365721.

Others, such as projected in WO2022029196 argue that multiple Machine Learning and Real-world Data may operate without orchestration through virtue of their autonomous or semi-autonomous functions using a "DNA print" obtained from object's manufacturer.

Machine Learning and Real-world Data reporting can be orchestrated, e.g., by using swarm intelligence algorithms, by higher network entities, events or situation, or be triggered by parameter threshold or certain events; e.g., a drone should send connection and flight related report to the network after an accident. Real-time autonomous swarm conduct and orchestration can be learned from non-drone related technologies pertaining to swarm conduct and orchestration. Hence for example, U.S. Pat. No. 9,208,462 discloses commercialization system and trading methods for generating a marketing-mix solution, comprising a step of generating, by a processor, multi-layered optimization and particle swarm optimization.

The problems to solve are four: (i) the nature of computation is complex as it involves decision making under uncertainty which further imply computational processes that require more computing-time than "real-time" can ever provide; (ii) more computing means that it will never be available online; (iii) existing methods for swarm conduct and orchestration are prone to exhibit complications of nondeterministic polynomial-time complete (NP-complete) decision problems and hence are extremely sensitive to the size of the swarm, therefor are limited in use for swarms populated with a relatively small amount of drones; and (iv) existing methods for coordinated swarm conduct and orchestration are silent when it comes to conducting multiple swarms in parallel, all the more so regarding the orchestrating and conducting multiple swarms that have multiple owners and hence different objectives.

All studies available in the art fail to disclose efficient technology for offline regulation of real-time complex mechanisms for swarm control. More than that, prior art fail to provide these complex mechanisms for swarm means of autonomous unmanned real-time reflexes to conduct and orchestrate swarms in a non-deterministic environment. Moreover, prior art does not address mechanisms that conduct and orchestrate multiple swarms at the same time.

SUMMARY OF THE INVENTION

It is hence an object of the invention to disclose an autonomous system for the orchestrion of at least one first swarm, comprising offline model-based subsystem for pre-computation of swarm strategies to be performed at real-time; and a real-time subsystem intercommunicated with the offline pre-commutating subsystem.

Another object of the invention is to disclose an autonomous method of orchestrating at least one first swarm, comprising intercommunicating model-based precomputed data of swarm strategies to be performed at real-time from an offline subsystem to a real-time subsystem.

Another object of the invention is to disclose a system for the orchestrion of at least one first swarm. The system comprises an offline subsystem for precomputation of swarm strategies to perform at real-time. The offline subsystem comprises a communication module configured to communicate with a plurality of application programming interface (APIs); timely ingestions and verifications module (TIV), configured for storing ingested data; and precomputation solver (PS), configured for processing the ingested data. The system further comprises a real-time subsystem. This RT subsystem comprises a swarm of objects; a router in continuous communication with the each object; a swarm runner and optimizer (SRO) configured to operate by a predefined protocol, provided in an intermitted communication with the router; a swarm generator (SW) in a continuous communication with the router, further continuously communicate with the Swarm Runner and Optimizer; at time the protocol is evoked, the SRO intercommunicates with a set of multiple real-time solvers (RTS); upon completion of required computational tasks and within a predefined timeline, the set of RTS feedback SRO, which optimizes the swarm over a predetermined strategy; the optimization is now communicated with the router and thereby intercommunicated to the relevant objects, which acknowledge the execution of order, namely, communicate via router with the SRO; optionally, the SRO communicates with a recorder hence updating status of the swarm of objects [1 . . . n]; and providing a database for further analysis; and the PS is provided, at least once, including at a time prior to real-time operation, in communication with the RTS.

Another object of the invention is to disclose a system and modules thereof as defined in any of the above, wherein the PS is configured for preparing session underling events space $[l^{\infty}]$ for each and every object in the swarm dataset; and preparing sessions' function-space $[L^{\infty}]$ for each and every object in the swarm dataset.

Another object of the invention is to disclose a system and modules thereof as defined in any of the above, wherein the communication is configured for delivering sessions functions space to the multi-layer real time solvers MLRTS; upon completing the delivering, the real-time sub-system is ready for kicking-off.

Another object of the invention is to disclose a system and modules thereof as defined in any of the above, wherein the set of MLRTS is configured for real-time communicating the SRO in a method of an instantaneous measure of state variables generating module (IMSV), computing and delivering the IMSV; verifying whether the IMSV is in the parameter range that underlies the subset of sessions' functions that are stored by RDBMS; if IMSV not in range, triggering a round of precomputation with an extended range of underlying IMSV—that is consistent with the most recent measure of IMSV—with appropriate tolerance; if IMSV is in range, by means of the Real-time functions generator RTMG, interpolating across objects' specific space, thereby obtaining the real-time instantaneous function for each object; by means of RTMG, and at a command of the swarm runner SR, interpolating across objects' specific space, thereby generating the real-time instantaneous function for each object, respectively; by means of a dominance graph generator DGG, generating gravity matrices and dominance graphs given real-time instantaneous functions and real-time signals; by means of moments generator MG, generating progression moments, selected from a group consisting of expected progression, covariance matrix, skew-model matrices, and kurtosis-model matrices, thereby providing arrays of expected progression, risk model, including covariance matrix, skew model, further including a set of matrices, kurtosis model, also including a set of matrices; by means of the RDBMS, providing the SR with inputs required for optimizations, selected from a group consisting of 'strategy & constrains', minimal set of variables (MSV), Schedule of operation, costs, and fees; by means of the SR, commanding a timely operation of the RTMG; by means of the SR, requiring swarm objects' moments; then optimizing over instantaneous swarm, according to the provisioned strategy and the set of constraints; providing the real time signal router RTSR orders, thereby post optimizing changes in swarm; Given the results of swarm optimization, desired changes in conduct are the difference between optimal swarm and its respective pre-optimization counterpart; by means of the RTSR, routing the orders to their respective objects; and by means of the objects, accepting order; executing orders by each and every swarm object, subject to a timeout; if one of the following is held true: (i) execution or (ii) a time out (cancelation), by means of the objects, responding the RTSR by returning execution details; delivering acknowledged-orders thereby record-keeping data, for either or both: by means of SR, next round of optimization; and offline analysis and adversarial learning; further by means of the objects continuously signaling to a real time signal router RTSR, heartbeats and outflow of parameters, selected from a group consisting of position, and current status; by means of the RTSR, feeding and streaming an instantaneous real time unified swarm as an input for decision making generators, selected from a group consisting of the IMSV generator and the DGG; optionally, by means of the SR, delivering to recorders evidential data items of operations research, selected from a group consisting of real-time feeds, inputs and outputs of the swarm runner and optimizer, orders transmitted, and respective executions, for system's future use; still optionally, by means of the recorders delivering the evidential data items to the RDBMS for further Storing of the recorded information; then providing an adversarial reinforcement learning generator ARLG data selected from a group consisting hereto recorded data, manually fed data, and ingested data; in parallel with the optional delivering, and in a mandatory manner, delivering to RDBMS the data items of operations research, selected from a group consisting of real-time feeds, inputs and outputs of the swarm runner and optimizer, orders transmitted, and respective executions; then Providing the ARLG data selected from a group consisting hereto recorded data, manually fed data, and ingested data; by means of the ARLG, configured for providing Learning and Quantitative Analysis (LQA), comprising at least one member of a group selected from back-testing results, training results, and thereby respective rules that establish session's MSVs; applying offline at least one member of a group consisting of: performing back testing, thereby revealing optimal strategies; performing adversarial learning and training, thereby obtaining session dependent optimal minimal set of variables MSV; and providing Session dependent MSV; still by means of the ARLG, outflowing the learning and quantitative analysis LQA to the RDBMS; precomputing and preparing one or more real-time operations session; comprising: ingesting data by means of communicator APIs or otherwise optionally (CAPI), and by means a timely ingestions and verifications module TIVM; storing and delivering the same to a communication module; and delivering to RDBMS ingested parameters, thereby facilitating the initiation of a session; then building records for objects and creating all session's data records; by means of the RDBMS, Providing required session's records and current status to the PS; by means of a model based reinforcement learning generator MBRLG, preparing session underling events space $[l^\infty]$ for each and every object in the swarm dataset; and sessions' functions-space $[L^\infty]$ for each and every object in the swarm dataset; then storing the same in RDBMS; triggering operation of MBRLG by means of real-time triggering module RTTM, and at time one of the following triggers is held true: time session precomputation is due according to a schedule defined by swarm's system administrator; IMSV is out of range; swarm composition updates; at least one object (n) updates; system administrator manually or otherwise administrator's approved overrides; in parallel and simultaneously, Freezing the swarm; and Unfreezing the swarm at time both of the following is held true: operation of comes to a successful end; and the real time signal Router receives from the swarm runner orders.

Another object of the invention is to disclose a system and modules thereof as defined in any of the above, wherein the system or modules are configured to orchestrion of at least one first swarm and simultaneously, orchestrion of at least one second swarm.

Another object of the invention is to disclose a method for the orchestrion of swarm, characterized by steps as follows: providing intercommunicated offline subsystem for precomputation of swarm strategies to be performed at real-time and real-time 3RT subsystem; within the offline subsystem, communicating with a plurality of application programming interface (APIs); by a communication module; storing ingested data by a timely ingestions and verifications module (TIV); processing the ingested data by a pre-computation solver (PS); the processing the ingested data by the PS, is provided at least once, including at a time prior to real-time operation, in intercommunicating with a multiple real-time solvers RTS; within the offline subsystem identifying a swarm of objects; continuously communicating with the each object by a router; operating by a predefined protocol, and intermittently communicating with the router; configuring a swarm runner and optimizer (SRO) to continuously communicating a swarm generator (SW) the router, further continuously communicating with the swarm runner and optimizer; intercommunicating at time the protocol is evoked, the SRO with a set of RTS; feedbacking SRO the set of RTS upon completion of required computational tasks, and within a predefined timeline, thereby optimizing the swarm over a predetermined strategy; intercommunicating the optimization with the router, thereby intercommunicating with relevant objects; the relevant objects acknowledging the execution of order, namely, communicating via router with the SRO upon completion of the intercommunication; and optionally, intercommunicating the SRO with a recorder thereby updating status of the swarm of objects; and providing a database for further analysis.

Another object of the invention is to disclose a method as defined in any of the above, wherein the method further comprising a step of configuring the PS for preparing session underling events space $[l^\infty]$ for each and every object in the swarm dataset; and preparing sessions' function-space $[L^\infty]$ for each and every object in the swarm dataset.

Another object of the invention is to disclose a method as defined in any of the above, wherein the method further comprising a step of configuring the communication for delivering sessions functions space to a multi-layer real time solvers MLRTS; and kicking-off the real-time sub-system upon completing the step of delivering.

Another object of the invention is to disclose a method as defined in any of the above, wherein the method further comprising a step of configuring the MLRTS for communicating in real-time with the SRO.

Another object of the invention is to disclose a method as defined in any of the above, wherein the real-time communication is provided by means of an instantaneous measure of state variables generating module (IMSV), whilst computing and delivering the IMSV; the method further comprising steps of verifying whether the IMSV is in the parameter range that underlies the subset of sessions' functions that are stored by RDBMS; if IMSV not in range, triggering a round of precomputation with an extended range of underlying IMSV, that is consistent with the most recent measure of IMSV, with appropriate tolerance; if IMSV is in range, interpolating across objects' specific space by means of the Real-time functions generator RTMG, thereby obtaining the real-time instantaneous function for each object [1 . . . n]; interpolating across objects' specific space, by means of RTMG, and at a command 161 of the swarm runner SR, thereby generating the real-time instantaneous function for each object, respectively; gravity matrices and dominance graphs given real-time instantaneous functions and real-time signals by means of a dominance graph generator DGG; generating progression moments, by means of moments generator MG and selecting a member of a group consisting of expected progression, covariance matrix, skew-model matrices, and kurtosis-model matrices, thereby providing arrays of expected progression, risk model, including covariance matrix, skew model, further including a set of matrices, kurtosis model, also including a set of matrices; providing the SR with inputs required for optimizations, by means of the RDBMS, and selecting the same from a group consisting of 'strategy & constrains', minimal set of variables (MSV), schedule of operation, costs, and fees; configuring and operating the SR for executing the following: commanding a timely operation of the RTMG; requesting swarm objects' moments by means of the SR; then optimizing over instantaneous swarm, according to the provisioned strategy and the set of constraints; post-optimizing changes in swarm by providing orders to the real time signal router RTSR; configuring and operating the RTSR for executing the following: routing the orders to their respective objects; and configuring and operating the objects for executing the following: accepting order; executing orders by each and every swarm object, subject to a timeout; responding the RTSR by returning execution details; if one of the following is held true: (i) execution or (ii) a time out (cancelation), by means of the objects; delivering acknowledged-orders thereby record-keeping data, for either or both: next round of optimization by means of SR; and offline analyzing and adversarial learning; continuously signaling to a real time signal router RTSR, heartbeats and outflow of parameters, selected from a group consisting of position, and current status, by means of the objects; feeding and streaming an instantaneous real time unified swarm as an input for decision making generators, selected from a group consisting of the IMSV Generator and the DGG, by means of the RTSR; optionally, delivering to Recorders evidential data items of operations research, selected from a group consisting of real-time feeds, inputs and outputs of the swarm runner and optimizer, orders transmitted, and respective executions, for system's future use, by means of the SR; still optionally, delivering the evidential data items to the RDBMS for further Storing of the recorded information, by means of the recorders; then providing an adversarial reinforcement learning generator ARLG data selected from a group consisting hereto recorded data, manually fed data, and ingested data; in parallel with the optional delivering, and in a mandatory manner, delivering to RDBMS the data items of operations research, selected from a group consisting of real-time feeds, inputs and outputs of the swarm runner and optimizer, orders transmitted, and respective executions; then providing the ARLG data selected from a group consisting hereto recorded data, manually fed data, and ingested data; providing learning and quantitative analysis (LQA) by means of the ARLG, configured for selecting the same from a group consisting of back-testing results, training results, and thereby providing respective rules for establishing session's MSVs; applying offline at least one member of a group consisting of: performing back testing, thereby revealing optimal strategies; performing adversarial learning and training, thereby obtaining session dependent optimal minimal set of variables MSV; and providing Session dependent MSV; outflowing the learning and quantitative analysis LQA to the RDBMS, still by means of the ARLG; precomputing and preparing one or more real-time operations session (11); comprising: ingesting data by means of a communicator APIs or otherwise optionally (CAPI); storing and delivering the same to a communication module by means a Timely Ingestions and Verifications module TIVM; and delivering to RDBMS ingested parameters, thereby facilitating the initiation of a session; then building records for objects, and creating all session's data records; providing required session's records and current status to the PS, by means of the RDBMS; preparing session underling events space $[l^\infty]$ for each and every object in the swarm data set; and sessions' functions-space $[L^\infty]$ for each and every object in the swarm dataset by means of a model-based reinforcement learning generator MBRLG; then storing the same in RDBMS; triggering operation of MBRLG by means of real-time triggering module RTTM, and at time one of the following triggers is held true: time session precomputation is due according to a schedule defined by swarm's system administrator; IMSV is out of range; swarm composition updates; at least one object (n) updates; system administrator manually or otherwise administrator's approved overrides; in parallel and simultaneously; freezing the swarm; and unfreezing the swarm at time both of the following is held true: operation of comes to a successful end; and the real time signal Router receives from the swarm runner.

Another object of the invention is to disclose a system as defined in any of the above, wherein the system is configured for the orchestrion of at least one first swarm and simultaneously, orchestrion of at least one second swarm.

Another object of the invention is to disclose a method as defined in any of the above, wherein the method configured for orchestrating at least one first swarm and simultaneously, orchestrating at least one second swarm.

Another object of the invention is to disclose a method as defined in any of the above, wherein the method comprising intercommunicating model-based data precomputed by an offline subsystem 3OL with a real-time 3RT subsystem.

The invention present exhibits a significant achievement relative to common systems that use adversarial learners typically produce big data MSVs that store "rules" for decision making based on model free data, that as a result are messy, and anecdotal. By contrast to the data driven rule-based approach, the hereto presented system offers a fine-tuning instrument to better the upshots of the model-based approach. It is hence another object of the invention is to disclose a method as defined in any of the above, wherein it comprises steps as follows: feeding recorded sessions data (RSD) into the adversarial reinforcement learner ARLG; and generating MSVs by means of said ARLG thereby fine-tuning session specific decisions.

Still another object of the invention is to disclose a method as defined in any of the above, wherein it is characterized by that the MSVs are small-data-structures of less than about 10 dimensions vector; each dimension is comprised of a subset of state-identifiers.

Another object of the invention is to disclose a method as defined in any of the above, wherein it further comprises step of communicating with at least one user [1 . . . m], by means of delivering protocols.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE PREFERRED EMBODIMENTS

In the following description, for purposes of explanation, numerous specific details are set forth in order to provide a thorough understanding of some example embodiments. It will be evident, however, to one skilled in the art that the present disclosure may be practiced without these specific details.

Figure 1:
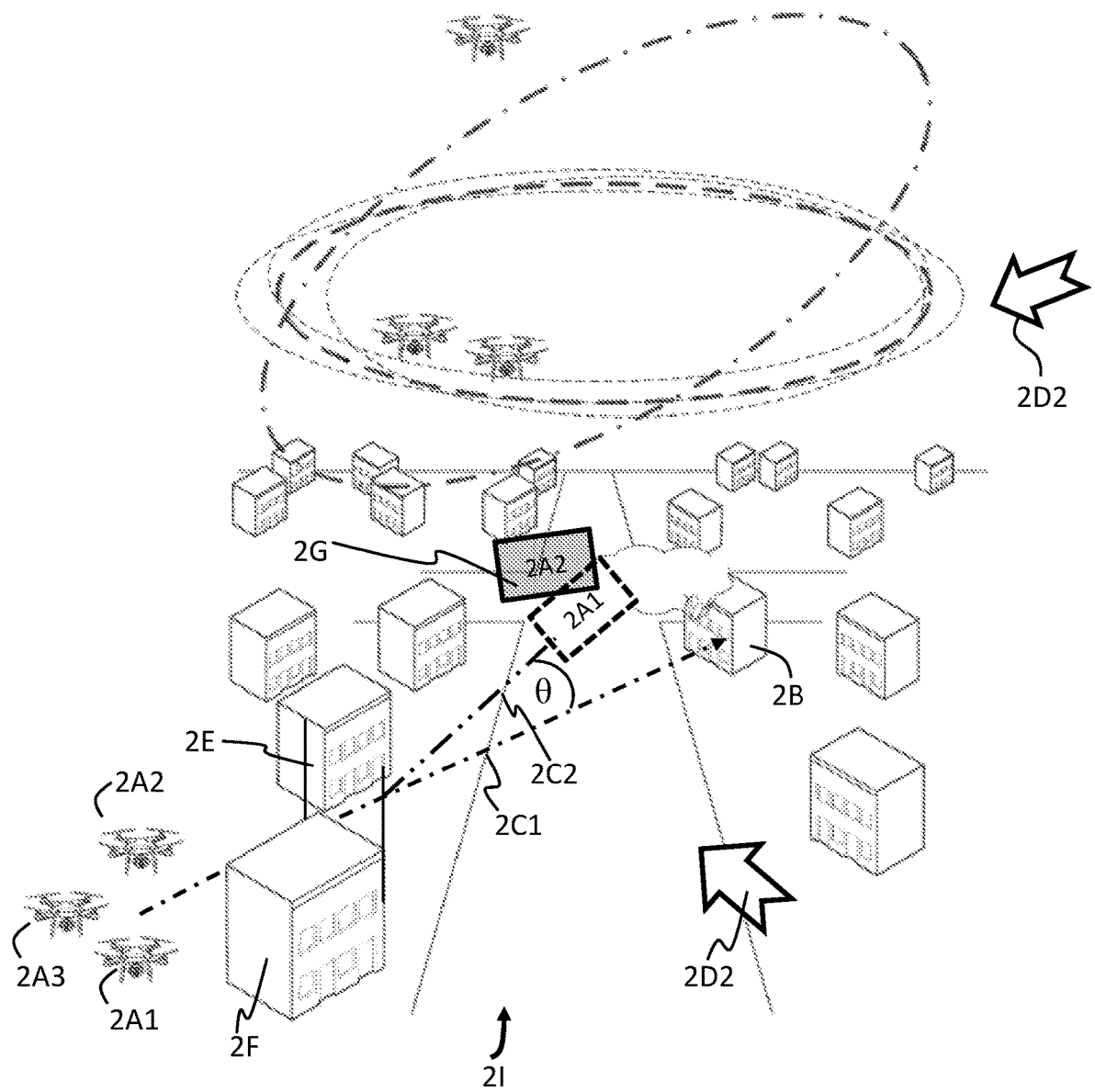
FIG. 1 presents prior art, hereto amended by adding new features according to a few embodiments of the invention.

Multiple drones may operate within shared airspace. Drones flown under independent direction in close proximity to one another are at risk of collision or interference. Independent drone control decreases the overall quantity of drones that could be flown in the same airspace. U.S. Ser. No. 10/937,324 teaches that drones' orchestration provides efficient and coordinated operating mechanisms for a mutual goal (FIG. 1, prior art, US20190392717 "Orchestration in heterogeneous drone swarms", hereto amended by adding new features), e.g., at time an object, member of the swarm, joining or leaving the swarm.

The terms "drone" and "object" interchangeably refer herein to any type of autonomous or semi-autonomous object, currently member or potentially member of a swarm, and may be selected from a group consisting inter alia (i) tangible items, including robots or vehicles, un-crewed vehicles, driverless cars, robots, unmanned aerial vehicles, unmanned marine vessels, satellites, rockets or the like; and (ii) intangible assets, such as records of data, IP address, financial securities, streams or series of signs that recognizes an object, identifiable merely by their time-resolved, coordinates, labels parameters, characterizations and/or specifications.

The term "swarm" refers hereinafter to a group, including a cluster of drones and at least one group of objects [1 . . . n] that at least a portion of the same is in either or both (i) a reciprocal relationship with one another or form an inter-related association; and (ii) independent, singular, non-correlative affiliation with one another, non-complementary or form a non-linked association. n is an integer greater than 1.

The term "orchestration" refers hereinafter in a non-limiting manner to the autonomous and automated arrangement, coordination, and management of complex computer systems, middleware, and services. The term can also be understood as having an inherent intelligence (trait) or even implicitly autonomic control or just automation or systems deploying elements of control. The term may also be understood in a context of virtualization, provisioning, and dynamic datacenter topics.

The term 'strategy' refers hereinafter to an information record that specifies an objective function and a set of constraints.

The term "user" refers hereinafter in a non-limiting manner to one or a plurality of m identified, authorized, authenticated and verified members of the group consisting in a non-limiting manner of: shops owning goods to be delivered; drone owners (e.g., Amazon, UPS, DHL); drone operators; underwriters, insurers, asset-managers, banks, and broker-dealers; trusty and money-clearance facilities; regulators, such as the municipality, governments, inter-government associations, Airports Authorities, Federal Aviation Administration, Air traffic controls; addressees etc.

The term "protocol" refers hereinafter to either or both (i) an identified, authorized, authenticated and verified protocols; (ii) block-chained protocols. Additionally, or alternatively, the term refers to a set of formal rules describing how to transmit data, especially across a network. Additionally, or alternatively, the term refers, in general, to digitized data and information in the form of computer software for representing and/or for implementing at least part of a particular flow of information, security procedures, sequences, and various interactions among different entities, associated with performing secure on-line transactions. In particular, a protocol refers to digitized data and information in the form of computer software for representing and/or for implementing at least part of a particular flow of information, security procedures, sequences, and various interactions among different entities, associated with on-line authenticating at least one user or a range 1 to m, where m in an integer equal or greater than 1, and/or on-line authenticating at least one on-line transaction, and/or, refers to digitized data and information, in the form of computer software, associated with performing at least one on-line transaction. More specifically, a protocol is at least one set, group, sequence, and/or series, of digitized data and information in the form of computer software for representing and/or for implementing at least part of a particular flow of information, security procedures, sequences, and various interactions among different entities, such as in the form of at least one data file comprising vectorized short information, at least one program file, and/or, at least one combination file featuring some combination of data, array of coordination and/or orientations, vectors, matrices, text, and/or, a program, associated with on-line authenticating users and/or transactions, and/or associated with performing on-line transactions.

Distributed ledger technology (DLT) is a digital system for recording the transaction of assets in which the transactions and their details are recorded in multiple places at the same time. Unlike traditional databases, distributed ledgers have no central data store or administration functionality. The term "blockchain" refers to a distributed database keeping a continuously growing list of registrations in blocks, which are specified incontestably, are kept up to date and cannot be adapted. Hereby, it is immaterial which variant of blockchain is intended, and all DLTs may serve as blockchain. Moreover, in a preferred method, the present invention is agnostic with respect to the specific blockchain used, and may be applied to any of a wide range of blockchain types without requiring alteration. In a preferred embodiment, the use of multiple blockchain types is possible concurrently, with e.g., a system that has access to multiple blockchains and registers a portion of data in blockchain A for user No. 1 while registering a second portion of data in blockchain B for user No. 2.

Reference is now made to FIGS. 2-6, schematically illustrating in a non-limiting manner flow charts and block diagrams of a few embodiments of the invention.

A system for the orchestrion of swarm of many drones [1 . . . n] is hereto disclosed; where n is ranging between an order of magnitude of dozens, hundreds, thousands to many millions or more different hereto-grouped objects. This system is characterized by both offline 3OL and real-time 3RT intercommunicated subsystems and computation operations thereof.

The nature of computation in such a real-time bigdata is complex as it involves decision making under real-time uncertainty which further imply computational processes that require more computing-time and computing means than "real-time" arrangements can ever provide. Hence, the hereto discloses means and methods offers at the first-time both swarm conduct and orchestration that is an n size-insensitive, especially designed to make numerous decisions under uncertainty in real time, while circumventing the discrepancy between the non-polynomial nature of the problem at hand and the requirement to respond in real time. Moreover, the technology presented here is configured for conducting and orchestrating multiple swarms in parallel.

The offline sub-orchestration system 3OL according to an embodiment of the invention is configured for precomputation of swarm strategies to be performed at real-time. It comprises, inter alia, the following three intercommunicated modules: (i) a communication module 300, configured to communicate 0301 with a plurality of application programming interface (APIs); (ii) timely ingestions and verifications module (TIV, 302), configured for storing (301) ingested data; and (iii) a precomputation solver (PS, 304), configured for processing the ingested data 303.

The aforesaid system further comprises a real-time subsystem 3RT which comprises or otherwise configured for conducting and/or orchestrating a swarm of drones [1 . . . n], as defined in any of the above.

It is according to an embodiment of the invention wherein each of the drones of the swarm is identifiable at either any time, or alternatively, at a well-defined time. Drone's time-resolved coordinates, labels, parameters, characterizations and/or specifications are retrievable or otherwise obtainable, e.g., available in a well-authorized, authenticated and verified manner, records of data, IP address, streams or series of signs that recognizes a drone, identifiable as the drone is a member or is potentially member of the swarm.

Figure 2:
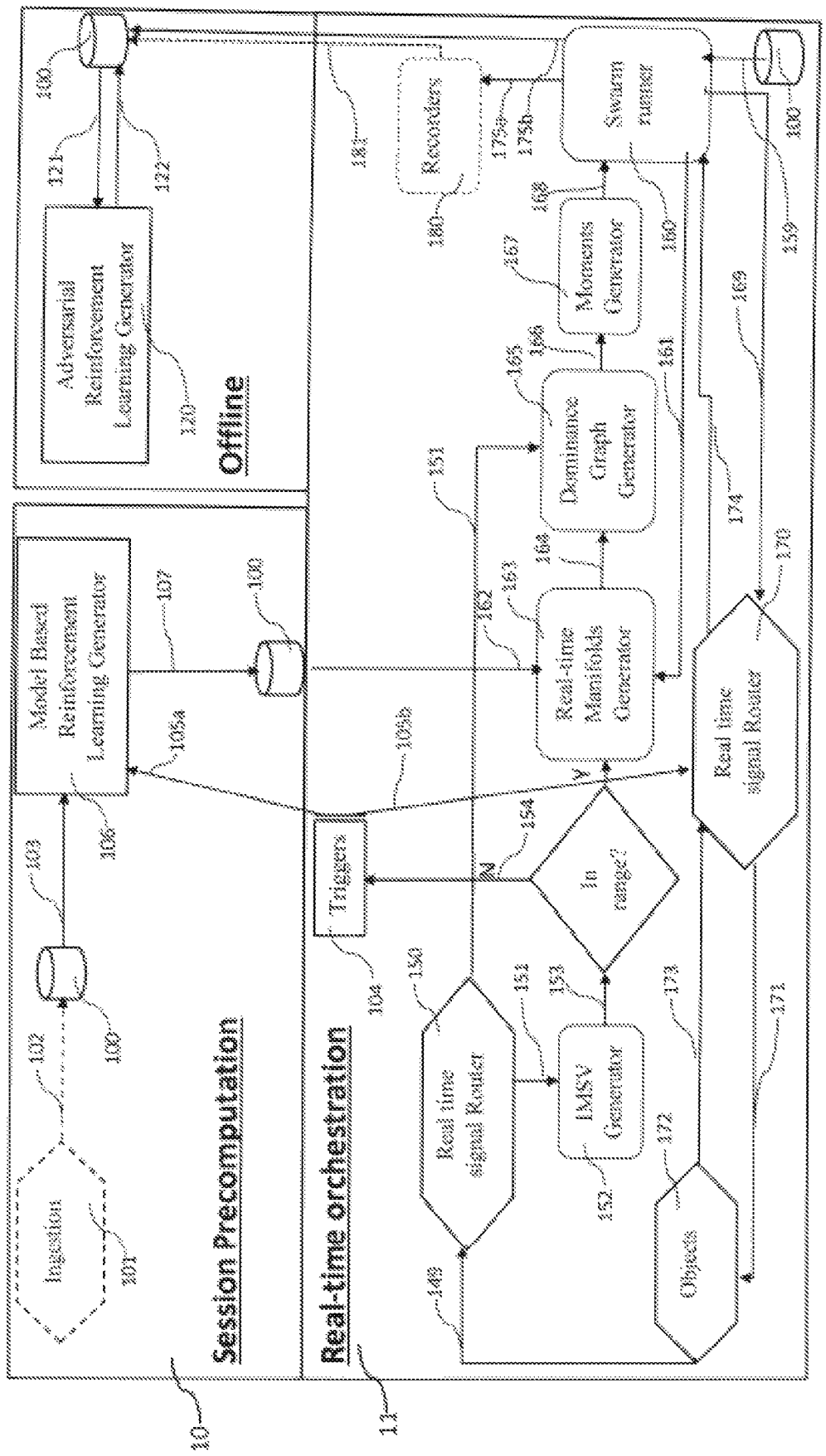
FIG. 2 schematically illustrates an autonomous optimal swarm conduct in real time according to a few embodiments of the invention.

Reference is now made to FIG. 2. The set of MLRTS 0355 is configured for autonomous real-time communicating 0356 SRO 0353 in a method comprising steps or otherwise, in the steps as follows: A module of instantaneous measure of state variables generating (IMSV, 152) is used for computing and delivering (0153) the IMSV. Then, IMSV variables are verified to be within a parameter range that underlies the subset of sessions' functions that are stored 0107 by RDBMS 100. Now, if IMSV variables are not in range, a step of triggering 0154 a round of precomputation with an extended range of underlying IMSV variables are provided, that is consistent with the most recent measure of IMSV variables with an appropriate tolerance. Otherwise, if IMSV variables are in range, by means of a real-time functions' generator RTMG, 0163, interpolating across 'objects' specific functions space, thereby obtaining the real-time instantaneous function 0164 for each object [1 . . . n]. The RTMG 163 is further used, and at a command 161 of a swarm runner SR, 160, it is interpolating across objects specific space, thereby generating 164 a real-time instantaneous function for each object, respectively. A dominance graph generator DGG, 165 is used for generating 166 gravity matrices and dominance graphs, given real-time instantaneous functions and real-time signals. A moments generator MG, 167 is used for generating progressions' moments. Those moments are selected in a non-limiting manner from a group consisting of expected progression, covariance matrix, skew-model matrices, and kurtosis-model matrices. Arrays are selectable in a non-limiting manner from a group consisting of expected progression, risk model, including covariance matrix, further including a set of matrices skew model, also including a set of matrices kurtosis model, are hence provided 168.

Still referring to FIG. 2, RDBMS 100 is used for providing 159 the SR 160 with inputs required for optimizations. Those are selectable in a non-limiting manner from a group consisting of 'Strategy & Constrains', minimal set of variables (MSVs), schedule of operation, costs, and fees. The SR 160 is then used for providing the following: commanding 161 a timely operation of RTMG 163 and requiring 161 swarm objects' moments; then optimizing over instantaneous swarm, according to the provisioned strategy and the set of constraints; and providing a real time signal router RTSR, 170 orders 169. By that, changes in swarm are post optimized, and results of swarm optimization are given, whereas desired changes in conduct are the difference between optimal swarm and its respective pre-optimization counterpart. RTSR 170 is used for routing 171 orders to their respective objects_172. The drones 172 are configured for accepting orders 171; and executing orders by each and every swarm object [1 . . . n], subject to a timeout. It is acknowledged that if one of the following is held true, namely (i) execution, or (ii) a time out (e.g., cancelation), objects_172 are configured for responding 173 RTSR 170 by returning execution details. The respond may comprise the follows: delivering 173 acknowledged-orders thereby record-keeping data, for either or both: (i) by means of SR 160, next round of optimization; and (ii) offline analysis and adversarial learning (120). Furthermore, objects_[1 . . . n] are configured for continuously signaling 149 to an RTSR (model real time signal router, 150) heartbeats and outflow of parameters. Those parameters are selectable in a non-limiting manner from members of a group consisting of position and current status. RTSR 150 is further used for feeding and streaming an instantaneous real time unified swarm 151 as an input for decision making generators. Those are selectable in a non-limiting manner from a group consisting of IMSV generator 152 and DGG 165. Optionally, and according to an embodiment of the invention, SR 160 is utilizable for delivering 175a to retrievable recorders 180 evidential data items of operations research. Those are selectable in a non-limiting manner from a group consisting of real-time feeds, inputs and outputs of the swarm runner and optimizer, orders transmitted, and respective executions, for system's future use. It is in the scope of the invention wherein swarm optimization is utilizable along an ongoing session; and learning generators are utilizable for long-run analysis, offline learning and training. Still optionally, and according to yet another embodiment of the invention, the recorders 180 delivering 181 the evidential data items to RDBMS 100 for further storing of the recorded information. Then, providing 121 a muddle names an adversarial reinforcement learning generator ARLG 120, data selected in a non-limiting manner from a group consisting of the hereto recorded data, manually fed data, and ingested data, utilizable for further quantitative analysis. In parallel with that optional step of delivering 175a, and in a mandatory manner, there is a step of delivering 175b to RDBMS 100 the data items of the operations research. The data is selectable in a non-limiting manner from a group consisting of real-time feeds, inputs and outputs of the swarm runner and optimizer, orders transmitted, and respective executions. This is provided, e.g., for system's future uses, such as swarm optimization, which is utilizable during the ongoing session; and the learning generators, utilizable for a long-run analysis, offline learning and training. Then, there is a step of providing 121 an ARLG 120 data. The data is selectable in a non-limiting manner from a group consisting of hereto recorded data, manually fed data, and ingested data, utilizable for further quantitative analysis.

ARLG 120 is further used for providing learning and quantitative analysis (LQA). The analysis may comprise at least one member of a group selected in a non-limiting manner from back-testing results, training results, and thereby respective rules that establish session's MSVs. The following is applied offline (12), namely at least one member of a group consisting of performing back testing, thereby revealing optimal strategies; performing adversarial learning and training, thereby obtaining session dependent optimal minimal set of variables MSV; and optionally, providing session dependent MSV, thereby allowing to further fine-tunning the calibration of a subset of parameters that underly the real-time decision processes. The ARLG 120 is also utilizable for outflowing 122 the LQA to the RDBMS 100. The following steps are now applied: precomputing and preparing (10) one or more real-time operations session (11). Within the session are comprised one or more members of a group selected in a non-limiting manner from ingesting data (101) by means of communicator APIs; optionally (CAPI, 300); further, by means a timely ingestions and verifications module TIVM 0302: storing and delivering 0303 the same to a communication module 0300; delivering 102 to RDBMS 100 ingested parameters, thereby facilitating an initiation of the session; then building records for the objects[1 . . . n], and creating all session's data records. RDBMS 100 is further used for providing 103 required session's records and current status to the PS, 304.

Still referring to FIG. 2, the center of the innovation lies in the separation between the precomputation session and the real time orchestration, where during the precomputation session a model-based reinforcement learning generator MBRLG 106, preparing session underling events space $[I^\infty]$ for each and every object in the swarm dataset; and sessions' functions-space $[L^\infty]$ for each and every object in the swarm dataset; then storing 107 the same in RDBMS 100. This important feature of the system governs and relates with the following: triggering 105a operation of MBRLG 106 by means of real-time triggering module RTTM 104, and at time one of the following triggers is held true: (i) time session precomputation is due according to a schedule defined by swarm's system administrator; (ii) IMSV 153 is out of range; (iii) swarm composition updates; (iii) at least one object (n) updates; (iv) system administrator manually or otherwise administrator's approved overrides. In parallel and simultaneously, the following is done: (i) freezing 105b the swarm; and (ii) unfreezing the swarm at time both of the following is held true: (a) operation of 106 comes to a successful end; and (b) the time signal Router 170 receives from the swarm runner 160 orders 169.

Figure 3:
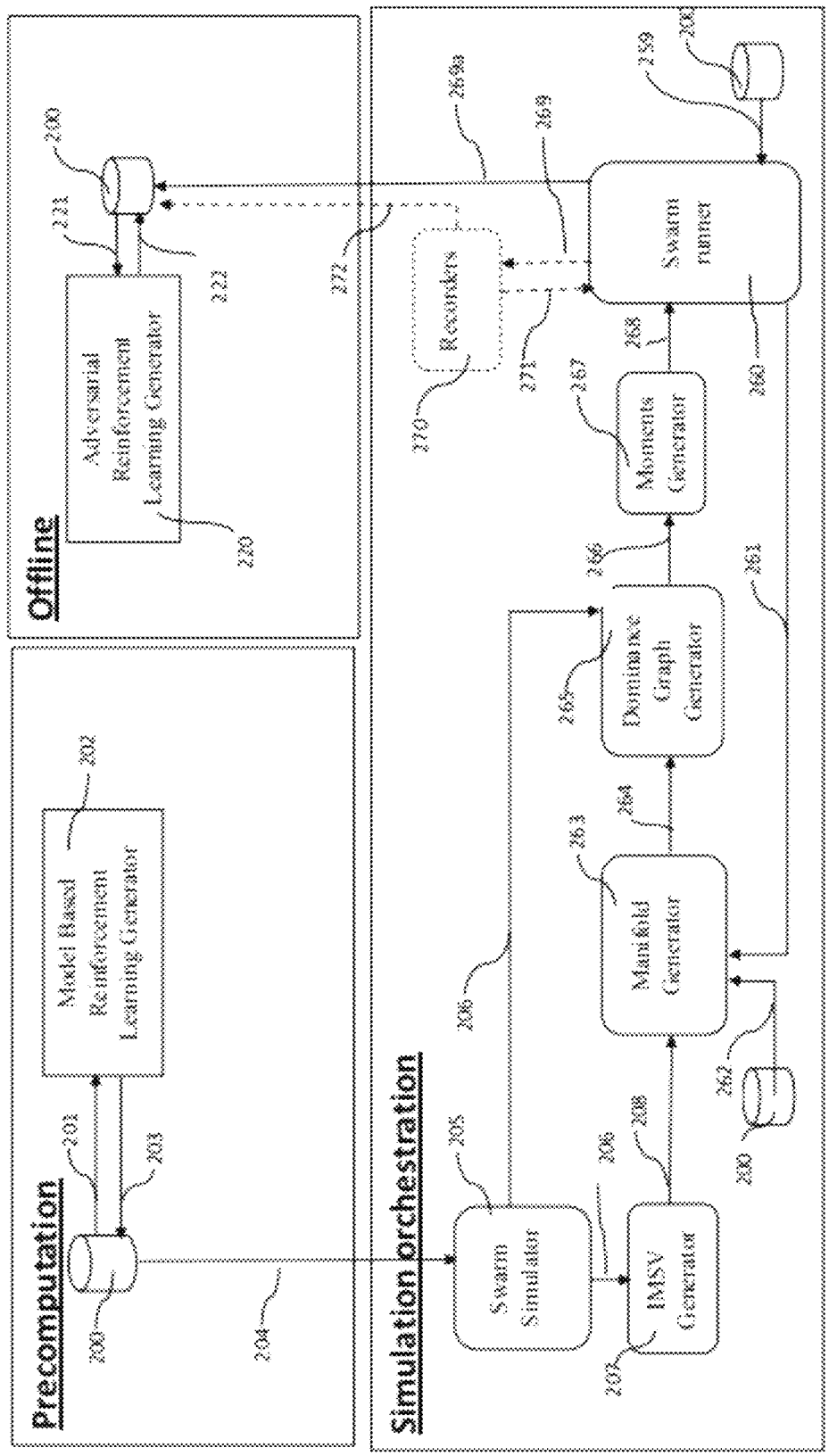
FIG. 3 schematically illustrates simulation and learning schematically according to a few embodiments of the invention.
Figure 4:
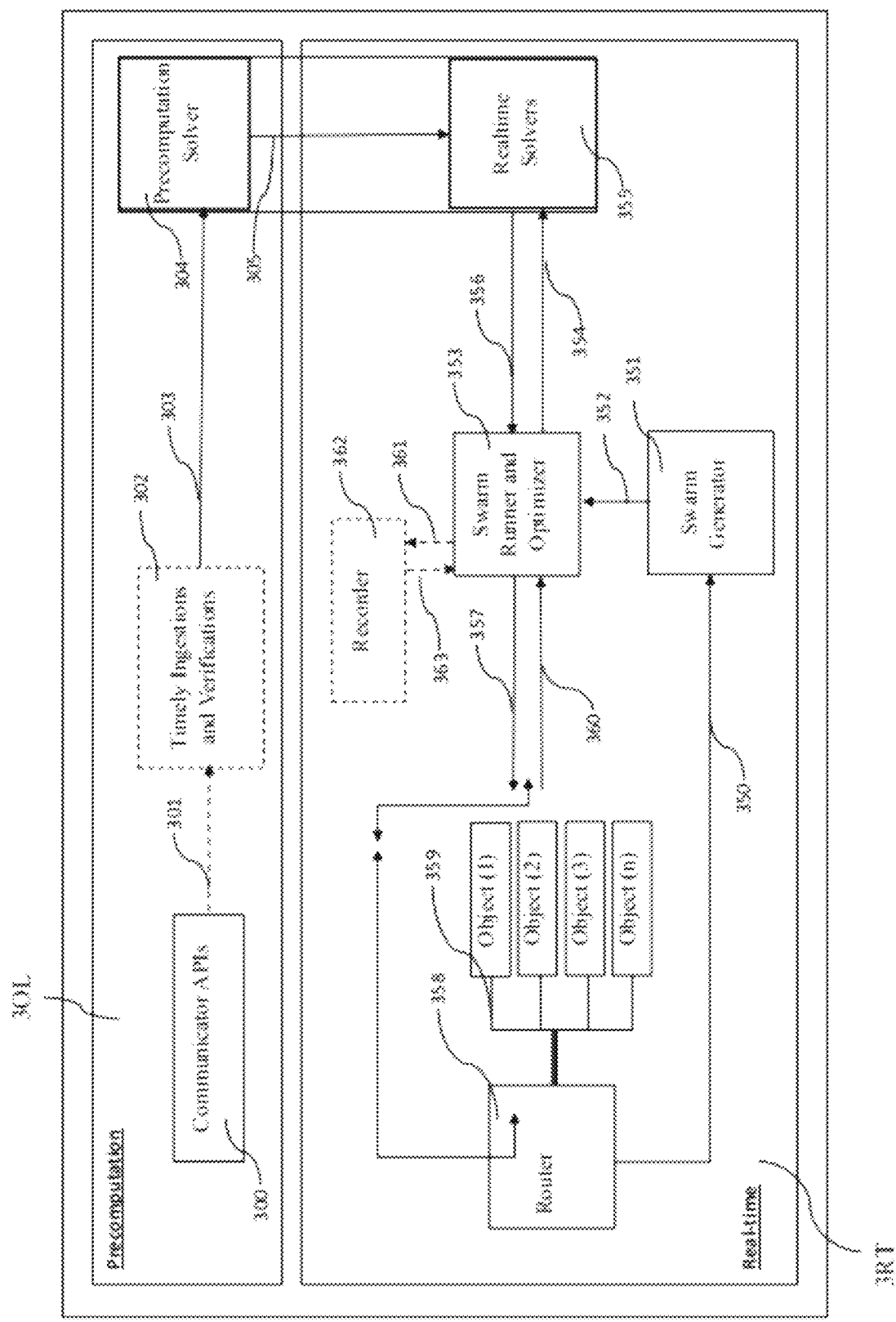
FIG. 4 schematically illustrates autonomous system and modules according to a few embodiments of the invention.

Reference is now made to FIG. 3. Central RDBMS 200 is configured as a cloud based relational database management system. Sessions' data structures required for precomputation 201 provides parameters and beginning of session data, parameters, building records for objects, and delivering all session's data records. A model-based reinforcement learning generator 202 prepares session's manifolds-decks for each and every object in the session's dataset. Session's manifolds-decks 203 are storing session's manifolds-decks at central RDBMS. Recorded data 204 are utilizable for Providing session's manifolds-decks and recorded swarm objects' histories. swarm simulator 205, for given recorded data, simulates the unified swarm as input for decision making generators in frequencies that fit the type of simulation (back-testing, training, recorded session simulation). IMSV generator 204 computes simulated instantaneous measure of state variables. IMSV 208 are for delivering the instantaneous measure of state variables generated from simulated feed. Offline subsystem comprises adversarial reinforcement learning generator 220 which Performs back testing so as to reveal optimal strategies. Performs adversarial learning, and training, to obtain state-related optimal MSV. These will serve as inputs to real-time decision processes. data 224 is for Providing recorded data, manually fed data, ingested data. Back-testing, adversarial learning outputs 222 is utilizes for storing back-testing results, training results State-related MSVs.

In FIG. 3, the simulation orchestration, strategies, MSVs, costs 259 are utilized for Providing to the swarm runner all inputs required for optimizations: strategy, MSV, schedule and optimization frequencies, costs, and fees. Swarm runner 260 performs swarm optimization according to a given strategy and a set of constraints. Request moments 261 are for Requesting simulated instantaneous objects' moments as input. Session's manifolds-decks 262 are Providing session manifolds-decks generated by the precomputation module. Manifolds generator 263 Interpolates across objects' specific decks, given the IMSV, so as to obtain the simulated real-time instantaneous manifold for each object, respectively. Instantaneous manifolds 264 are Providing the simulated instantaneous objects' manifolds. Dominance graph generator 265 generates gravity matrices and dominance graphs given the simulated instantaneous manifolds and recorded signals. It is also configured for providing dominance graphs 266. Dominance graphs 267 generates progression moments: expected progressions, covariance matrix, skew-model matrices, and kurtosis-model matrices. Moments' generator 268 provides arrays of expected progressions, risk model, i.e., covariance matrix, skew model i.e., a set of matrices, kurtosis model i.e., a set of matrices. Orders 269 provide a correspondence between optimal orders to their respective objects. store swarm runner's info 269a is provided useful for Storing info generated by the runner into the RDBMS for use of adversarial learning analyzer and trainer. Recorders 270 record all inputs and outputs of the portfolio runner and optimizer, generated trades, recorded sessions for use in simulations and training. In 271, acknowledgement provides recorded objects responses with respect to matches between order and execution or a time out (cancelation). Lastly, store recorders' info 272 is for Storing recorders info into the RDBMS for use of adversarial learning analyzer and trainer, and for recorded sessions' simulations In FIG. 4, a block diagram of a system according to an embodiment of the invention, a router 358 is provided in a continuous communication 359 with drone of the swarm, drones [1 . . . n]. Another module, namely Swarm Runner and Optimizer (SRO, 353) is configured to operate by a predefined protocol. This module is provided in an intermitted communication 360 with the router 358.

Another module, namely a Swarm Generator (SG, 351) is also provided in a continuous communication with the router 358, and is configured to continuously communicate 352 with the SRO 353.

At time the protocol is evoked, the SRO 353 intercommunicates 354 with a set of multiple real-time solvers (MLRTS, 355). Upon completion of required computational tasks, and within a predefined timeline, the set of MLRTS 355 feedback 356 SRO 353, which optimizes the swarm over a predetermined strategy, The hereto calculated optimization is now communicated 357 with the router 0358, and thereby intercommunicated 359 to relevant drones (1 . . . n). Upon receiving the updates, the drone acknowledges the execution of order, namely, communicate 360, via router 358 with the SRO 353.

The SRO 353 optionally communicates 361 with a recorder 362. Hence the system obtains and updated status 363 of drones [1 . . . n] of the swarm. The system is also provided with an updated database for further analysis.

An important feature of the system is that "required anticipated (-possible) reflexes" of the swam and drones thereof is precalculated offline. Now, preliminary to time and situation at which n size-insensitive-swarm and drones thereof are experiencing a real-time need for behavioral reflexes, they are well equipped with an updated means to 'reflex' in appropriate manner at need.

Modules and methods for precomputation are hence provided, by means of the PS 304 for calculating the functions that underlie real-time reflexes. Such a precomputation is done at least once. A preferable time for such an offline pre-computing step is e.g., at a time prior to swarm and drones' real-time operation. The aforesaid offline precomputing is communicated 305 with the real-time module MLRTS 355 that in practice generates the reflexes in real-time.

Example 1

Reference is made again to FIG. 1, adapted from prior art, illustrating in an out of scale manner a swarm of drones [2A1 . . . 2A3] planning to approach at low altitude to building 2B via root 2C1. Anticipated root 2C1 is determined by commercially available atmospheric forecast at <1,000 ft, e.g., wind speed 2 m/s, coming from north-east. Nevertheless, at low-attitude urban environment, wind is tunneled 2C2 (deflected at time at angle $\theta$ from course 2C1) and strengthen, e.g., see wind 2D2, stroking form south-east, 10 m/s, so when passing via tall buildings 2E and 2F, swarm is suddenly pushed north-wise. Drone 2A1 is affected by strokes of wind 2D2 more than drone 2A2, and possibly the two do collide 2G above main street 21.

This colliding 2G and hazards thereof are avoided by the system and methods of the present invention. Here, prior of flying, the planned course 2C1 is a subject of offline pre-calculation, where required anticipated (-possible) reflexes are determined and stored. One of those 'reflexes' are responses to possible wind tunneling. By parameterizing this potential hazard, the system builds a parameter-based alternative strategy for the swarm in crossing building 7F. Now, at real-time, swarm reflexes are sharp: instantaneous and accurate, providing the swarm with a set of relevant time-resolved updated flight parameters, so that the collision 2G of drone 2A1 at 2A2 is avoided.

In this patent, $l^\infty$ refers to a (real or complex) vector space of bounded sequences with the supremum norm, and $L^\infty$ denotes a function space. Its elements are the essentially bounded measurable functions. More precisely, $L^\infty$ is defined based on an underlying measure space, $(X, \Sigma, m)$, see de Sá, João Carlos Santana. "RViz based simulation for motion control of swarm robotics." (2022) It is according to yet another embodiment of the invention, wherein the module PS 0304 is configured for both: (i) preparing a session of underling events space $[l^\infty]$ for each and every drone [1 . . . n] in the swarm dataset; and (ii) preparing sessions' function-space $[L^\infty]$ for each and every drone [1 . . . n] in the swarm dataset.

It is according to yet another embodiment of the invention, wherein communication 0305 is configured for delivering sessions functions space to the multi-layer real time solvers MLRTS 355. The system is preferably configured that upon completing the delivering, the real-time subsystem 03RT is ready for kicking-off.

Example II

It is according to yet another embodiment of the invention, wherein the set of MLRTS 0355 is configured for autonomous real-time communicating 0356 the SRO 0353 in a method comprising steps or otherwise, in the steps as follows: A module of instantaneous measure of state variables generating (IMSV, 152) is used for computing and delivering (0153) the IMSV. Then, IMSV are verified to be within a parameter range that underlies the subset of sessions' functions that are stored 0107 by RDBMS 100. Now, if IMSV are not in range, a step of triggering 0154 a round of precomputation with an extended range of underlying IMSV is provided, that is consistent with the most recent measure of IMSV—with an appropriate tolerance. Otherwise, if IMSV is in range, by means of a Real-time functions' generator RTMG, 0163, interpolating across drones' specific functions space, thereby obtaining the real-time instantaneous function 0164 for each drone [1 . . . n].

The RTMG 163 is further used, and at a command 161 of a swarm runner SR, 160, it is interpolating across drones' specific space, thereby generating 164 a real-time instantaneous function for each drone, respectively.

A dominance graph generator DGG, 165 is used for generating 166 gravity matrices and dominance graphs, given real-time instantaneous functions and real-time signals.

A moments generator MG, 167 is used for generating progressions' moments. Those moments are selected in a non-limiting manner from a group consisting of expected progression, covariance matrix, skew-model matrices, and kurtosis-model matrices.

Arrays selected in a non-limiting manner from a group consisting of expected progression, risk model, including covariance matrix, further including a set of matrices skew model, also including a set of matrices kurtosis model, are hence provided 168.

RDBMS 100 is used here for providing 159 the SR 160 with inputs required for optimizations. Those are selected in a non-limiting manner from a group consisting of 'Strategy & Constrains', minimal set of variables (MSV), Schedule of operation, costs, and fees.

The SR 160 is used for providing the following: commanding 161 a timely operation of the RTMG 163 and requiring 161 swarm drones' moments; then optimizing over instantaneous swarm, according to the provisioned strategy and the set of constraints; and providing the real time signal router RTSR, 170 orders 169, By that, changes in swarm are post optimized, and the results of swarm optimization are given, whereas desired changes in conduct are the difference between optimal swarm and its respective pre-optimization counterpart.

The RTSR 170 is used for routing 171 the orders to their respective drones 172. The drones 172 are configured for accepting orders 171; and executing orders by each and every swarm drone [1 . . . n], subject to a timeout.

It is acknowledged that if one of the following is held true, namely (i) execution, or (ii) a time out (e.g., cancelation), the Drones 172 are configured for responding 173 the RTSR 170 by returning execution details. The respond may comprise the follows: delivering 173 acknowledged-orders thereby record-keeping data, for either or both: (i) by means of SR 160, next round of optimization; and (ii) offline analysis and adversarial learning (120).

Furthermore, drones [1 . . . n] are configured for continuously signaling 149 to an RTSR (model real time signal router, 150) heartbeats and outflow of parameters. Those parameters are selected in a non-limiting manner from members of a group consisting of position and current status.

RTSR 150 is further used for feeding and streaming an instantaneous real time unified swarm 151 as an input for decision making generators. Those are selected in a non-limiting manner from a group consisting of IMSV Generator 152 and DGG 165.

Optionally, and according to an embodiment of the invention, SR 160 is used for delivering 175a to retrievable recorders 180 evidential data items of operations research. Those are selected in a non-limiting manner from a group consisting of real-time feeds, inputs and outputs of the swarm runner and optimizer, orders transmitted, and respective executions, for system's future use. It is in the scope of the invention wherein swarm optimization is utilizable along an ongoing session; and learning generators are utilizable for long-run analysis, offline learning and training.

Still optionally, and according to yet another embodiment of the invention, the recorders 180 delivering 181 the evidential data items to RDBMS 100 for further storing of the recorded information. Then, providing 121 a muddle names an adversarial reinforcement learning generator ARLG 120, data selected in a non-limiting manner from a group consisting of the hereto recorded data, manually fed data, and ingested data, utilizable for further quantitative analysis.

In parallel with that optional step of delivering 175a, and in a mandatory manner, there is a step of delivering 175b to RDBMS 100 the data items of the operations research. The data is selected in a non-limiting manner from a group consisting of real-time feeds, inputs and outputs of the swarm runner and optimizer, orders transmitted, and respective executions. This is provided, e.g., for system's future uses, such as swarm optimization, which is utilizable during the ongoing session; and the learning generators, utilizable for a long-run analysis, offline learning and training. Then, there is a step of providing 121 an ARLG 120 data. The data is selected in a non-limiting manner from a group consisting of hereto recorded data, manually fed data, and ingested data, utilizable for further quantitative analysis.

ARLG 120 is further used for providing learning and quantitative analysis (LQA). The analysis may comprise at least one member of a group selected in a non-limiting manner from back-testing results, training results, and thereby respective rules that establish session's MSVs. The following is applied offline (12), namely at least one member of a group consisting of performing back testing, thereby revealing optimal strategies; performing adversarial learning and training, thereby obtaining session dependent optimal minimal set of variables MSV; and optionally, providing session dependent MSV, thereby allowing to further fine-tunning the calibration of a subset of parameters that underly the real-time decision processes.

The ARLG 120 is also utilizable for outflowing 122 the LQA to the RDBMS 100. The following steps are now applied: precomputing and preparing (10) one or more real-time operations session (11). Within the session are comprised one or more members of a group selected in a non-limiting manner from ingesting data (101) by means of communicator APIs; optionally (CAPI, 300); further, by means a timely ingestions and verifications module TIVM 0302: storing and delivering 0303 the same to a communication module 0300; delivering 102 to RDBMS 100 ingested parameters, thereby facilitating an initiation of the session; then building records for the drones [1 . . . n], and creating all session's data records.

RDBMS 100 is further used for providing 103 required session's records and current status to the PS, 304.

A model-based reinforcement learning generator MBRLG 106, preparing session underling events space [$1^\infty$] for each and every drone in the swarm dataset; and sessions' functions-space [$L^\infty$] for each and every drone in the swarm dataset; then storing 107 the same in RDBMS 100.

This important feature of the system governs and relates with the following: triggering 105a operation of MBRLG 106 by means of real-time triggering module RTTM 104, and at time one of the following triggers is held true: (i) time session precomputation is due according to a schedule defined by swarm's system administrator; (ii) IMSV 153 is out of range; (iii) swarm composition updates; (iii) at least one drone (n) updates; (iv) system administrator manually or otherwise administrator's approved overrides.

In parallel and simultaneously, the following is done: (i) freezing 105b the swarm; and (ii) unfreezing the swarm at time both of the following is held true: (a) operation of 106 comes to a successful end; and (b) the time signal Router 170 receives from the swarm runner 160 orders 169.

Example III

Sequential decision making, commonly formalized as Markov decision process (MDP) optimization, is a key challenge in artificial intelligence. Two successful approaches to solve this set of problems are planning and reinforcement learning. Planning and learning may actually be combined, in a field which is known as model-based reinforcement learning. Model-based RL was defined as an MDP approach that uses a model (known or learned) and uses learning to approximate a global value or policy function, a.k.a. 'strategy'.

In practice, reinforcement learning systems can make decisions in one of two ways. In the model-based approach, a system uses a predictive model of the world to ask questions of the form "what will happen if I do?" to choose the best x, in the alternative model-free approach, the modeling step is bypassed altogether in favor of learning a control policy directly from a given set of data.

Predictive models can be used to ask "what if?" questions to guide future decisions. Existing literature groups model-based learning algorithms into four categories to highlight the range of uses of predictive models: (A) Analytic gradient computation—Assumptions about the form of the dynamics and cost function are convenient because they can yield closed-form solutions for locally optimal control. Even when these assumptions are not valid, receding-horizon control can account for small errors introduced by approximated dynamics. Similarly, dynamics models parametrized as Gaussian processes have analytic gradients that can be used for policy improvement, Controllers derived via these simple parametrizations can also be used to provide guiding samples for training more complex nonlinear policies; (B) Sampling-based planning—In the fully general case of non-linear dynamics models, we lose guarantees of local optimality and must resort to sampling action sequences. The simplest version of this approach, random shooting, entails sampling candidate actions from a fixed distribution, evaluating them under a model, and choosing the action that is deemed the most promising. More sophisticated variants iteratively adjust the sampling distribution, as in the cross-entropy method or path integral optimal control. In discrete-action settings, however, it is more common to search over tree structures than to iteratively refine a single trajectory of waypoints. Common tree-based search algorithms have underpinned recent impressive results in games playing, and iterated width search. Sampling-based planning, in both continuous and discrete domains, can also be combined with structured physics-based, object-centric priors; (C) Model-based data generation—An important detail in many machine learning success stories is a means of artificially increasing the size of a training set. It is difficult to define a manual data augmentation procedure for policy optimization, but we can view a predictive model analogously as a learned method of generating synthetic data; and (D) Value-equivalence prediction which does not fit neatly into model-based versus model-free categorization, is to incorporate computation that resembles model-based planning without supervising the model's predictions to resemble actual states Instead, plans under the model are constrained to match trajectories in the real environment only in their predicted cumulative reward. These value-equivalent models have shown to be effective in high-dimensional observation spaces where conventional model-based planning has proven difficult.

Figures 5A, 5B:
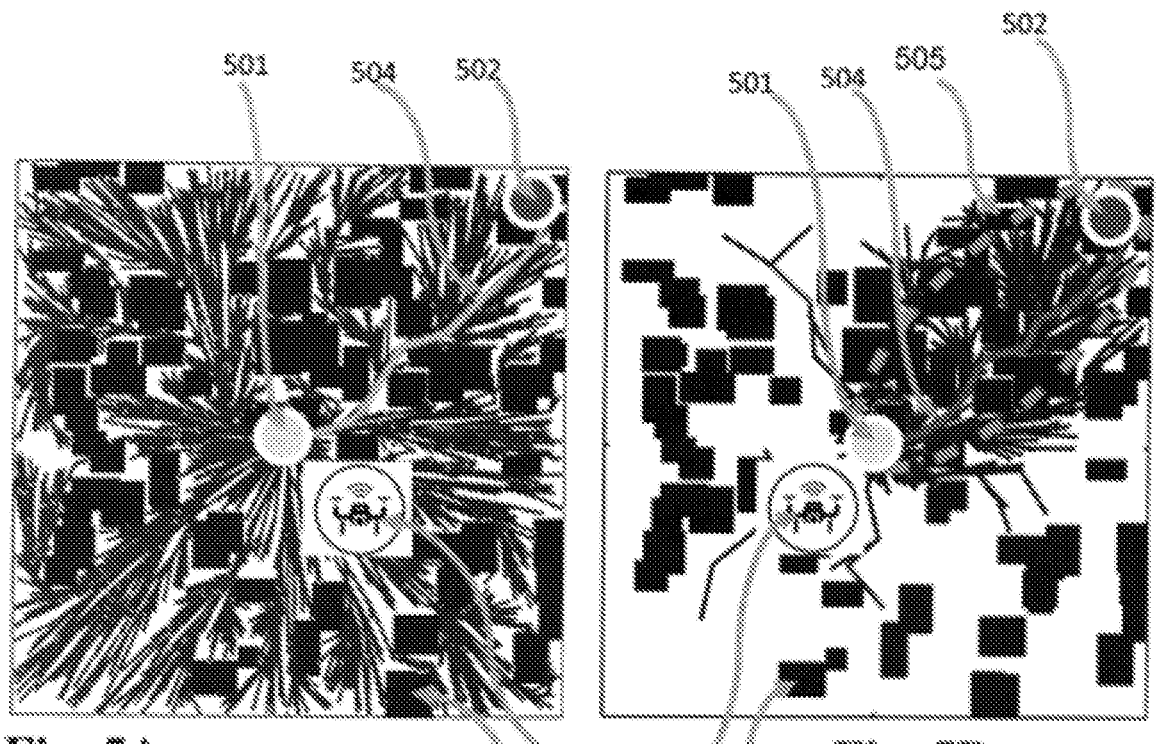
FIGS. 5A 5B and 5C schematically illustrating autonomous model-based data generation according a few embodiments of the invention.
Figure 5C:
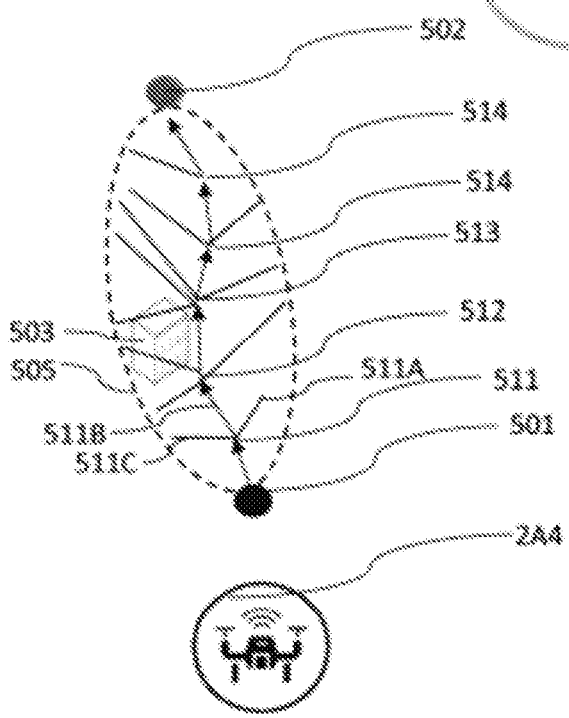

This invention for autonomous conduct and orchestration of swarms in real time embeds all aforementioned approaches to Model Based Reinforcement Learning invention. In particular, PS 304 embeds (C) Model-based data generation to generate the sub space of $l^\infty$—the event space—that underlies the swarm session pre computation, and approaches (B) Sampling-based planning and (D) Value-equivalence prediction to generate the subspace of $L^\infty$—the function space—that underlies the swarms session. In addition, MLRTS 355 embeds a multilayer of (A) Analytic gradient computation solvers to generate the reflex response required in real time applications. Reference is now made to FIGS. 5A, 5B and 5C schematically illustrating an autonomous model-based data generation according to an embodiment of the invention, provided useful for generating a sub-space of $l^\infty$, i.e., event space, that underlies the swarm session pre-computation and approaches thereof. In these examples, drone 2A4, an object in a swarm (not shown) is planned to change its coordination (and/or values, specifications etc.) from initial point at time $T_0$ 501 to end point, at time $T_{end}$ 502, in an environment rich with various obstacles and time resolved restrictions 503, via an offline calculated model-based root 504. In FIGS. 5A-C, blue indicia exhibit a random-event-tree that stands for aforesaid event space $l^\infty$, and pink trajectory 505, which exhibits a convergence path of a set of response functions given the informed model over functions space $L^\infty$. FIG. 5C depicts in details a drone 2A4 allocated at an initial starting point 50. A first set of possible (anticipated-) obstacles and time-resolved restrictions facing its development at location 511 (time $T_{511}$), namely three different possible trajectories 511A-C(or otherwise change of values, specifications etc.). At location 513, namely at time $T_{513}$, the system considers five different model-based roots, and so on and so forth. Nevertheless, as the "distance" of the object to end point is shorter, less different roots are to be calculated, hence shaping the trajectory scheme 505 in its characteristic leaf-like profile. Example IV hence demonstrates the important role of the system and method of the present invention in autonomously (unmanned-) calculated offline model-based strategy for the objects and swarm to change at a real-time data-rich environments.

The example given by FIG. 5 is not restricted only for drone's flight paths. The present invention discloses and enables capacity to precompute a complex solution to model-based reinforcement learning problems can cover a wide range of applications. For example, an autonomous real-time system for investing and trading portfolios comprised of cash-money and bonds. In this application, the system seeks, before the trade starts, convergence path of a response function for each and every financial fixed-income security registered for trade. The function provided here, via the reinforcement learners, allow other modules of the system to interpret a wide range of the prices of aforesaid securities, that the system may encounter during that trade day and provide the optimal reflex response, i.e., the response that maximizes reward to the client from implementing the client's strategy over his portfolio.

Reinforcement learning (RL) is a widely used method for learning to make decisions in complex, uncertain environments. Typically, an RL agent perceives and acts in an environment, receiving rewards that provide some indication of the quality of its actions. Given the aforementioned 'Strategy', which is an information record that specifies an objective function and a set of constraints, the agent's goal is to maximize the sum of rewards received. RL algorithms may work by learning a value function that describes the long-term expected sum of rewards from each state. A key problem in reinforcement learning is to assure convergence of the value function. In FIGS. 5A-C, e.g., a precomputation solver generates the sessions underlying functions space. In particular an object specific response function, that converges to an approximate global optimum for any agnostically learnable class. Convergence is demonstrated on FIG. 5A over the entire event space demonstrated by the blue tree. It is obvious that at the outset the solution. i.e., the functional form that the learner is striving to achieve, is bounded to a subset of the event tree. The green dot represents the initial object specific function at the outset of the learning process, the red dot is the solution to which the learner converges hence the solution to the learning problem, the grey ellipse in FIG. 5B marks the boundaries of subset of possible solutions, and the pink line is the convergence path.

In practice the hereto disclosed technology is providing a general-purpose machine where the user can plug in his "model". If the user provides a well-defined model that fits the underlying problem at hand, the response function will converge to a solution, subject to a provisioned tolerance, almost surely.

It is according to another embodiment of the invention wherein a method for the orchestrating of at least one first swarm is disclosed.

The method is characterized by providing intercommunicated offline subsystem 3OL for precomputation of swarm strategies to be performed at real-time and real-time 3RT subsystem.

Now for the offline subsystem 3OL: the method is provided useful by following steps, or otherwise, the steps as defined hereinafter: communicating 0301 with a plurality of application programming interface (APIs) by a communication module 300; storing ingested data by a timely ingestions and verifications module (TIV, 302); and processing the ingested data 303 by a pre-computation solver (PS, 304). The processing of the ingested data 303 by the PS 304 is provided at least once, e.g., at a time prior to real-time operation, by intercommunicating 305 with multiple real-time solvers MLRTS 355.

Now for the real-time subsystem 3RT: the method is provided useful by following steps, or otherwise, the steps as defined hereinafter: identifying a swarm of drones [1 . . . n]; and continuously communicating 359 with each drone [1 . . . n] by a router 358.

There is provided a sequence of steps related with operating in a predefined protocol, and intermittently communicating 360 with the router 358. The sequence of steps includes configuring a swarm runner and optimizer (SRO, 353) to continuously communicating a swarm generator (SG, 351) with the router 358, further continuously communicating 352 with the swarm runner and optimizer 353. Intercommunicating 354 at time the protocol is evoked the SRO 353 with a set of MLRTS, 355. Feedbacking 356 SRO 353 with the set of MLRTS 355 upon completion of required computational tasks, and within a predefined timeline, thereby optimizing the swarm over a predetermined strategy. Intercommunicating 357 the optimization with the router 0358, thereby intercommunicating 359 with relevant drones [1 . . . n]. The relevant drones [1 . . . n] are acknowledging the execution of order, namely, communicating 360 via router 358 with the SRO 353 upon completion of the intercommunication 359; and optionally, further intercommunicating 361 the SRO 353 with a recorder 362, thereby updating status 363 of the swarm of drones [1 . . . n]; and providing a database for further analysis.

It is according to an embodiment of the invention wherein the method of orchestrating the swarm further comprising a step of configuring the PS 304 for preparing session underling events space [$I^\infty$] for each and every drone [1 . . . n] in the swarm dataset; and preparing sessions' function-space [$L^\infty$] for each and every drone [1 . . . n] in the swarm dataset.

It is according to an embodiment of the invention wherein the method of orchestrating the swarm further comprising a step of configuring the communication 0305 for delivering sessions functions space to a multi-layer real time solvers MLRTS 355; and kicking-off the real-time sub-system 03RT upon completing the step of delivering.

It is according to an embodiment of the invention wherein the method of orchestrating the swarm further comprising a step of configuring the MLRTS 0355 for communicating 0356 in real-time with the SRO 0353.

It is according to an embodiment of the invention wherein the method of orchestrating the swarm further comprising a step of real-time communicating. The communication is provided by means of an instantaneous measure of state variables generating module (IMSV, 152), whilst computing and delivering (0153) the IMSV.

It is in the scope of the invention wherein the method further comprising steps of verifying whether the IMSV is in the parameter range that underlies the subset of sessions' functions that are stored 0107 by RDBMS 100. If IMSV not in range, triggering 0154 a round of precomputation with an extended range of underlying IMSV, that is consistent with the most recent measure of IMSV, with appropriate tolerance. If IMSV is in range, interpolating across drones' specific space by means of the Real-time functions' generator RTMG, 0163, thereby obtaining the real-time instantaneous function 0164 for each drone [1 . . . n]. interpolating across drones' specific space, by means of RTMG 163, and at a command 161 of the swarm runner SR, 160, thereby generating 164 the real-time instantaneous function for each drone, respectively. Generating 166 gravity matrices and dominance graphs given real-time instantaneous functions and real-time signals by means of a Dominance Graph Generator DGG, 165. Generating progression moments, by means of Moments generator MG, 167 and selecting a member of a group consisting of expected progression, covariance matrix, skew-model matrices, and kurtosis-model matrices, thereby providing 168 arrays of expected progression, risk model, including covariance matrix, skew model, further including a set of matrices, kurtosis model, also including a set of matrices. Providing 159 the SR 160 with inputs required for optimizations, by means of the RDBMS 100, and selecting the same from a group consisting of 'Strategy & Constrains', minimal set of variables (MSV), schedule of operation, costs, and fees.

It is also in the scope of the invention wherein the method further comprising steps of configuring and operating the SR 160 for executing the following: commanding 161 a timely operation of the RTMG 163; requiring 161 swarm drones' moments by means of the SR 160; then optimizing over instantaneous swarm, according to the provisioned strategy and the set of constraints; and post-optimizing changes in swarm by providing the real time signal router RTSR, 170 orders 169.

It is also in the scope of the invention wherein the method further comprising steps of configuring and operating the RTSR 170 for executing the following: routing 171 the orders to their respective drones 172; and configuring and operating the drones 172 for executing one, a few or all of the following: accepting order 171; executing orders by each and every swarm drone [1 . . . n], subject to a timeout; responding 173 the RTSR 170 by returning execution details; if one of the following is held true: (i) execution or (ii) a time out (cancelation), by means of the drones 172; and delivering 173 acknowledged-orders thereby record-keeping data, for either or both: next round of optimization by means of SR 160; and offline analyzing and adversarial learning (120).

It is also in the scope of the invention wherein the method further comprising steps of continuously signaling 149 to a real time signal router RTSR, 150 heartbeats and outflow of parameters, selected from a group consisting of position, and current status, by means of the drones [1 . . . n]. Feeding and streaming an instantaneous real time unified swarm 151 as an input for decision making generators, selected from a group consisting of the IMSV Generator 152 and the DGG 165, by means of the RTSR 150. Optionally, delivering 175*a* to Recorders 180 evidential data items of operations research, selected from a group consisting of real-time feeds, inputs and outputs of the swarm runner and optimizer, orders transmitted, and respective executions, for system's future use, by means of the SR 160. Still optionally, delivering 181 the evidential data items to the RDBMS 100 for further Storing of the recorded information, by means of the recorders 180; then providing 121 an adversarial reinforcement learning generator ARLG 120 data selected from a group consisting hereto recorded data, manually fed data, and ingested data.

It is also in the scope of the invention wherein the method further comprising steps provided in parallel with the aforesaid optional step of delivering 175*a*, and in a mandatory manner, delivering 175*b* to RDBMS 100 the data items of operations research, selected from a group consisting of real-time feeds, inputs and outputs of the swarm runner and optimizer, orders transmitted, and respective executions; then providing 121 the ARLG 120 data selected from a group consisting hereto recorded data, manually fed data, and ingested data. Providing LQA by means of the ARLG 120, configured for; selecting the same from a group consisting of back-testing results, training results, and thereby providing respective rules for establishing session's MSVs. Applying offline (12) at least one member of a group consisting of (i) performing back testing, thereby revealing optimal strategies; (ii) performing adversarial learning and training, thereby obtaining session dependent optimal minimal set of variables MSV; and (iii) providing Session dependent MSV. Outflowing 122 the learning and quantitative analysis LQA to the RDBMS 100, still by means of the ARLG 120.

It is also in the scope of the invention wherein the method further comprising steps of precomputing and preparing (10) one or more real-time operations session (11); comprising: (i) ingesting data (101) by means of a communicator APIs, or otherwise optionally (CAPI, 300); storing and delivering 0303 the same to a communication module 0300 by means a Timely Ingestions and Verifications module TIVM 0302; and, (ii) delivering 102 to RDBMS 100 ingested parameters, thereby facilitating the initiation of a session; then building records for drones [1 . . . n], and creating all session's data records. Further steps are providing 103 required session's records and current status to the PS, 304, by means of the RDBMS 100; and preparing session underling events space [$l^\infty$] for each and every drone in the swarm data set; and sessions' functions-space [$L^\infty$] for each and every drone in the swarm dataset by means of a model-based reinforcement learning generator MBRLG 106; then storing 107 the same in RDBMS 100.

In a first root 105*b*, it is also in the scope of the invention wherein the method further comprising steps of triggering 105*a* operation of MBRLG 106 by means of real-time triggering module RTTM 104, and at time one of the following triggers is held true: time session precomputation is due according to a schedule defined by swarm's system administrator; IMSV 153 is out of range; swarm composition updates; at least one drone (n) updates; and system administrator manually or otherwise administrator's approved overrides.

In a second root 105*b*, it is also in the scope of the invention wherein the method further comprising steps provided in parallel, and simultaneously: freezing the swarm steps 105*b*; comprising unfreezing the swarm at time both of the following is held true: operation of 106 comes to a successful end; and the real time signal Router 170 receives from the swarm runner.

Example IV

Existing methods for coordinated swarm conduct and orchestration are silent when it comes to conducting multiple swarms in parallel, all the more so regarding the orchestrating and conducting multiple swarms that have multiple owners and hence different objectives.

The technology of the present invention, however, discloses efficient methods and means for conducting parallel multi-swarm multi-strategy. In an embodiment of the invention, the autonomous operated system is cloud-based, so in practice its computational resources are unlimited. Furthermore, the system utilizes these resources very efficiently. In fact, the system is so efficient that in the context of parallel conduct of swarms, its overall computing resource costs grow linearly with the number of swarms it manages.

It is according to an embodiment of the invention wherein such high efficiencies are yielded by methods that are structured to separate the main problem into two phases of solution (off-line, and real-time). The methods also employ a model-based reinforcement learning; these two modalities of operation reduce the complexity of computation to a polynomial order of magnitude per swarm, and at costs that grows linearly in the number of swarms that are being managed in parallel.

It is still according to an embodiment of the invention wherein the runner performs convex optimization which is highly efficient. The system and methods are hence configured for are managing computational processes, each exhibiting polynomial complexity, one after the other which further allows to use cloud based parallel processing efficiently for the purpose of multi-swarm management.

Figure 6:
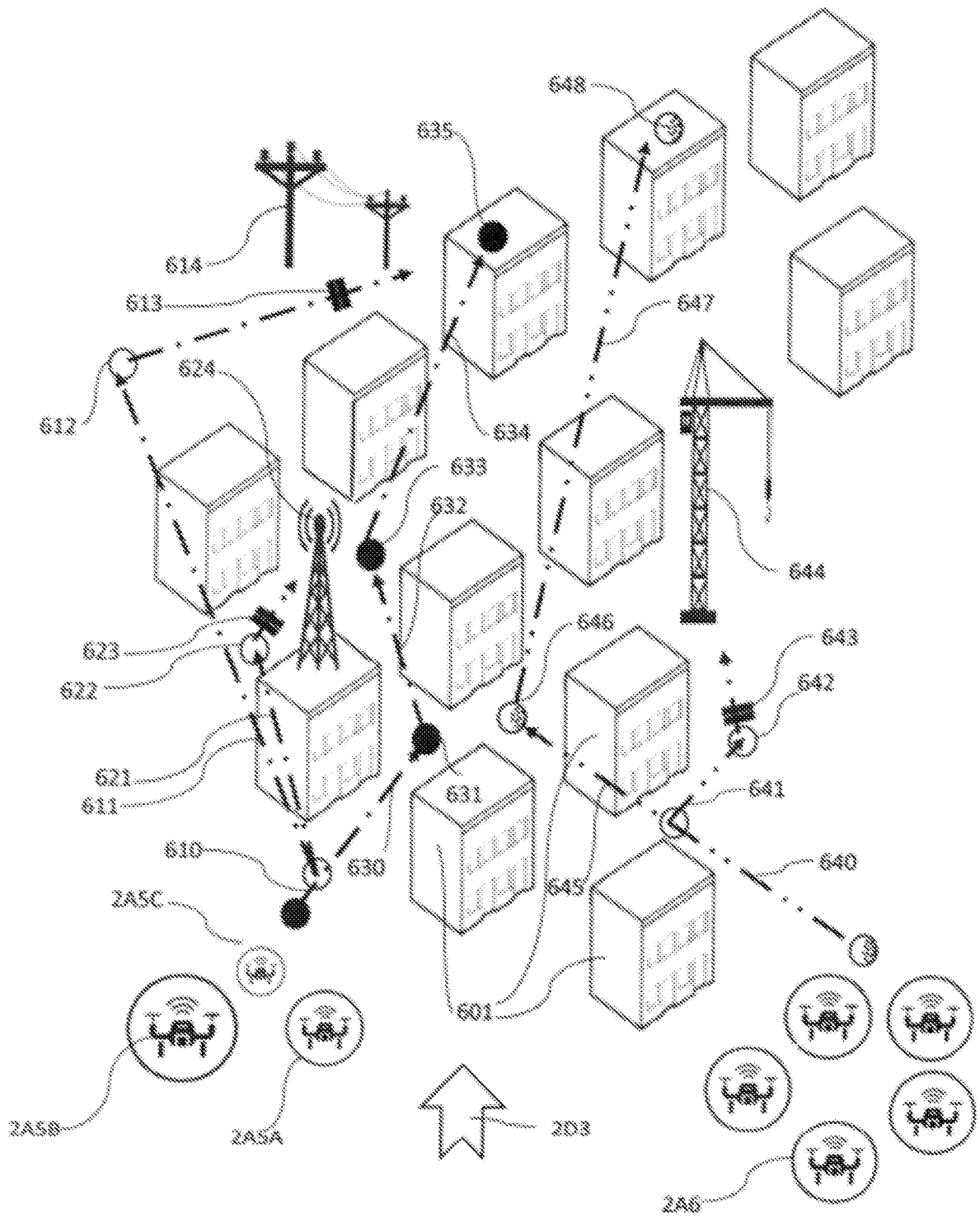
FIG. 6 schematically illustrating in an out-of-scale manner means and methods for an autonomous conduct, provided in parallel, of multiple swarms having hence multiple strategies according to an embodiment of the invention.

Reference is now made to FIG. 6, schematically illustrating in an out-of-scale manner means and methods for conducting in parallel multiple swarms having hence multiple strategies.

At least one first swarm comprises drones of various sizes and thus individual real-time conduct, see at least one midsize drone 2A5A, see at least one big size drone 2A5B and see at least one small drone 2A5C. In a first location (610) [and/or coordinates, change of conditions or specifications, time-resolved values, etc.] strategy is required for, orchestrating, conducting or otherwise determining the next movement or next action to be taken by the swarm, considering that exact period of time and time-resolve environment (e.g., wind 2D3) in urban neighborhood rich in buildings 601. One possible root is to take a first pathway 611 then turning 612 towards the endpoint 635. This pathway is calculated offline to be blocked 613 due to adjacent electric wires 614. A second possible pathway 612-622-623 is blocked due to a possible danger (high communication tower 624), Hence, the offline precalculated risks observing risks, obstacles and time-dependent restrictions (here e.g., wind, remaining power in batteries) optimizes the change (here—in flight) of heterogenic swarm along time (here—location, height, 6D-orientation etc.) is provided, so that real-time conduct comprises action 603, turn at 631, action 632, turn at 633 and finally action 634 to endpoint 635. Second swarm homogeneously comprises object 2A6. Starting in action 640 to a possible junction. If turning to action 641, turn 642 and further action, the swarm might meet crane 644, so this root is blocked 643. Hence, offline pre-calculation avoids this root, and the swarm is strategized to action 645, turn 646, and final action 647 to endpoint 648. Here, the system and methods of the present invention delt in parallel with two different swarms, each of which is having its own strategy. Moreover, as shown in final roots 634 and 647 of the first and second swarm, respectively, the system and method of the present invention are provided useful for orchestrating the two in parallel. At least one first swarm comprises drones of various sizes and thus individual real-time conduct, see at least one midsize drone 2A5A, see at least one big size drone 2A5B and see at least one small drone 2A5C. In a first location (610) [and/or coordinates, change of conditions or specifications, time-resolved values, etc.] strategy is required for, orchestrating, conducting or otherwise determining the next movement or next action to be taken by the swarm, considering that exact period of time and time-resolve environment (e.g., wind 2D3) in urban neighborhood rich in buildings 601. One possible root is to take a first pathway 611 then turning 612 towards the endpoint 635. This pathway is calculated offline to be blocked 613 due to adjacent electric wires 614. A second possible pathway 612-622-623 is blocked due to a possible danger (high communication tower 624), Hence, the offline precalculated risks observing risks, obstacles and time-dependent restrictions (here e.g., wind, remaining power in batteries) optimizes the change (here—in flight) of heterogenic swarm along time (here—location, height, 6D-orientation etc.) is provided, so that real-time conduct comprises action 603, turn at 631, action 632, turn at 633 and finally action 634 to endpoint 635. Second swarm homogeneously comprises object 2A6. Starting in action 640 to a possible junction. If turning to action 641, turn 642 and further action, the swarm might meet crane 644, so this root is blocked 643. Hence, offline pre-calculation avoids this root, and the swarm is strategized to action 645, turn 646, and final action 647 to endpoint 648. Here, the system and methods of the present invention delt in parallel with two different swarms, each of which is having its own strategy. Moreover, as shown in final roots 634 and 647 of the first and second swarm, respectively, the system and method of the present invention are provided useful for orchestrating the two in parallel.

Example V

The method and systems of the present invention are also provided useful for autonomous real-time investing & trading in financial securities, namely a parallel core of an innovative platform that hosts business and client applications. Subsequent applications provide services that until today are not available even for professionals: autonomous investing and trading in financial securities including stocks, commodities, as well as fixed-income securities and bonds, which are the largest and most liquid market in the world. The hereto disclosed systems, modules and methods are utilizable for managing portfolios comprised of marketable securities and cash money: the system generates optimal portfolios, and the respective trade orders required to convert existing portfolios to their instantaneous optimal portfolio counterparts in real time, at trading frequencies configured by the user. Optimal portfolios are generated using multiple layers of machine learning algorithms using a minimum set of variables that are measurable and observable in the real world in real time, and is based on a number of inputs including the current portfolio, strategies that fit users' preferences, the menu of costs that the client is obliged to pay to all involved intermediaries, and desired frequencies of trading. The original value the invention is an autonomous set of robots that maximize the users' preferences in the context of portfolio management and require no human intervention neither any inputs from human analysts. The original contribution of the invention arrives from the invention's capacity to generate required securities' statistical moments of return distributions in real time, which further enables rebalancing of existing portfolios into their optimal counterparts in real time while internalizing all associated fees. The resulting rebalancing trade orders are automatically transmitted to the respective trade-venue and the brokers so as to be executed and cleared. The invention is autonomous and self-sufficient, automatically tracks its performance and acknowledged executions received from the respective trade-venue, and continuously rebalances the portfolio according to trading schedules and frequencies configured by the user. The invention autonomously creates all required databases and data entities required for its operation. The invention provisions multi-strategy investments and trading frequencies while considering all costs that are associated with optimizing and rebalancing the optimal position of marketable securities and cash. In the aforementioned setup there is no limit as to the number of different strategies that a single client can run in parallel. In practice most clients are diversifying their portfolios by allowing a variety of strategies to be carried out over different sub-portfolios. These sub-portfolios are optimized in parallel by different robots i.e., strategies, at various schedules and frequencies. At the same time and by the same machine there is no limit to the amount of different, and most importantly separated clients-accounts, that are under management in parallel. Since the invention resides on the cloud it can acquire computational resources on demand and hence there is no limit to the number of clients that get service in parallel.

It is hence applicable in the current technology wherein the users are clients, portfolio owners, which include retail investors, as well as business institutions, financial institutions, hedge funds, banks, etc.; custodian institutions who hold clients' assets under their custody; broker-dealers who provide execution services; clearing-brokers who provide clearing services; asset managers who supervise the autonomous orchestration and conduct of the portfolios under their management, including the approval of new strategies, back-testing performance carrying out risk control analysis and trade related back office audit including all required regulatory compliance, and trade venues that receive trade orders from the autonomous trading robots, match them with counterparties, and respond either with an acknowledgement or a rejection. Without loss of generality, a client is allowed and in fact encouraged to become his own asset manager. In fact, the invention allows its users to play a few roles at the same time thus saving considerable costs while earning high returns. For example, a pension fund that presently outsource its portfolio of fixed-income securities to a hedge-fund, or another type of expert asset manager, can directly manage its fixed-income position at a fraction of the cost while enjoying high returns and liquidity at the highest extent.

All patents, patent publications, and other publications referenced and identified in the present specification are individually and expressly incorporated herein by reference in their entirety for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The invention claimed is:
1. A system for the orchestration of at least one first swarm, comprising:
  an offline subsystem (3OL) for precomputation of swarm strategies to be performed in real time, comprising:
    a communication module (300) configured to communicate (301) with a plurality of Application Programming Interface (APIs);
    a Timely Ingestions and Verifications module (TIV, 302), configured for storing (301) ingested data; and
    a Precomputation Solver (PS, 304), configured for processing said ingested data (303);
  a real-time 3RT subsystem comprising:
    a swarm of objects [1 . . . n];
    a router (358) in continuous communication (359) with said each object [1 . . . n];
    Swarm Runner and Optimizer (SRO, 353) configured to operate by a predefined protocol, provided in an intermitted communication (360) with said router (358);
    a Swarm Generator (SG, 351) in a continuous communication with said router (358), further continuously communicate (352) with said Swarm Runner and Optimizer (353);
    at time said protocol is evoked, said SRO (353) intercommunicates (354) with a set of multiple real-time solvers (MLRTS, 355); upon completion of required computational tasks, and within a predefined timeline, said set of MLRTS (355) feedback (356) said SRO (353), which optimizes said swarm over a predetermined strategy; said optimization is now communicated (357) with said router (358) and thereby intercommunicated (359) to the relevant objects [1 . . . n], which acknowledge the execution of order, namely, communicate (360) via router (358) with said SRO (353);
    said PS (304) is provided, at least once, including at a time prior to real-time operation, in communication (305) with said MLRTS (355);
  wherein said set of MLRTS (355) is configured for real-time communicating (356) said SRO (353) in a method of:
    by means of an instantaneous measure of state variables generating module (IMSV, 152), computing and delivering (153) said IMSV;
    verifying whether said IMSV is in the parameter range that underlies the subset of sessions' functions that are stored (107) by RDBMS (100);
    if IMSV not in range, triggering (154) a round of precomputation with an extended range of underlying IMSV—that is consistent with the most recent measure of IMSV—with appropriate tolerance;
    if IMSV is in range, by means of said Real-time functions generator RTMG (163), interpolating across objects' specific space, thereby obtaining said real-time instantaneous function (164) for each object [1 . . . n];
    by means of RTMG (163), and at a command (161) of said swarm runner SR (160), interpolating across objects' specific space, thereby generating (164) said real-time instantaneous function for each object, respectively;
    by means of a dominance graph generator DGG (165), generating (166) gravity matrices and dominance graphs given real-time instantaneous functions and real-time signals;
    by means of Moments Generator MG (167) generating progression moments, selected from the group consisting of expected progression, covariance matrix, skew-model matrices, and kurtosis-model matrices, thereby providing (168) arrays of expected progression, risk model, including covariance matrix, skew model, further including a set of matrices, kurtosis model, also including a set of matrices;
    by means of said RDBMS (100), providing (159) said SR (160) with inputs required for optimizations, selected from the group consisting of 'strategy & constrains', minimal set of variables (MSV), Schedule of operation, costs, and fees;
    by means of said SR (160),
      commanding (161) a timely operation of said RTMG (163);
      by means of said SR (160), requiring (161) swarm objects' moments;
      then optimizing over instantaneous swarm, according to said provisioned strategy and said set of constraints;
      providing said real time signal router RTSR (170) orders (169), thereby post optimizing changes in swarm;
    by means of said RTSR (170),
      routing (171) said orders to their respective objects (172); and
      by means of said objects (172),
        accepting order (171);
        executing orders by each and every swarm object [1 . . . n], subject to a timeout;
        responding (173) said RTSR (170) by means of said objects (172), by returning execution details if one of the following is true: (i) execution or (ii) a time out (cancellation);
        delivering (173) acknowledged orders thereby record-keeping data, for either or both:
          by means of SR (160), next round of optimization; and
          offline analysis and adversarial learning (120);
    further by means of said objects [1 . . . n] continuously signaling (149) to a Real-time Signal Router RTSR,

(150) heartbeats and outflow of parameters, selected from the group consisting of position, and current status;

by means of said RTSR (150), feeding and streaming an instantaneous real time unified swarm (151) as an input for decision making generators, selected from the group consisting of said IMSV generator (152) and said DGG (165);

delivering (175b) to RDBMS (100) said data items of operations research, selected from the group consisting of real-time feeds, inputs and outputs of the swarm runner and optimizer, orders transmitted, and respective executions; then Providing (121) said ARLG (120) data selected from the group consisting hereto recorded data, manually fed data, and ingested data;

by means of said ARLG (120), configured for providing learning and quantitative analysis (LQA), comprising at least one member of the group selected from back-testing results, training results, and thereby respective rules that establish session's MSVs; applying offline (12) at least one member of the group consisting of:
  performing back testing, thereby revealing optimal strategies;
  performing adversarial learning and training, thereby obtaining session dependent optimal minimal set of variables MSV; and
  providing Session dependent MSV;

still by means of said ARLG (120), outflowing (122) said learning and quantitative analysis LQA to said RDBMS (100);

precomputing and preparing (10) one or more real-time operations session (11); comprising:
  ingesting data (101) by a means selected from the group consisting of communicator APIs and (CAPI, 300), and by means a Timely Ingestions and Verifications module TIVM (302); storing and delivering (303) the same to a communication module 300; and delivering (102) to RDBMS (100) ingested parameters, thereby facilitating the initiation of a session; then building records for objects [1 . . . n], and creating all session's data records;
  by means of said RDBMS (100), providing (103) required session's records and current status to said PS (304);
  by means of a model-based reinforcement learning generator MBRLG (106), preparing session underling events space [l$^\infty$] for each and every object in the swarm dataset; and sessions' functions-space [L$^\infty$] for each and every object in the swarm dataset; then storing (107) the same in RDBMS (100);
  triggering 105a operation of MBRLG (106) by means of real-time triggering module RTTM (104), and at time one of the following triggers is held true:
    time session precomputation is due according to a schedule defined by swarm's system administrator;
    IMSV (153) is out of range;
    swarm composition updates;
    at least one object (n) updates;
    system administrator manually or otherwise administrator's approved overrides;
  in parallel and simultaneously,
freezing (105b) said swarm; and,
unfreezing the swarm at time both of the following is held true:
  operation of MBRLG (106) comes to a successful end; and, said real time signal router (170) receives from said swarm runner (160) orders (169).

2. The system according to claim 1, wherein said PS (304) is configured for:
  preparing session underlying events space [l$^\infty$] for each and every object [1 . . . n] in the swarm dataset; and
  preparing sessions' function-space [L$^\infty$] for each and every object [1 . . . n] in the swarm dataset.

3. The system according to claim 1, wherein said communication (305) is configured for delivering sessions functions space to the multi-layer real time solvers MLRTS (355); upon completing said delivering, said real-time subsystem 3RT is ready for kicking-off.

4. The system according to claim 1, configured to orchestration of at least one first swarm and simultaneously, orchestration of at least one second swarm.

5. The system according to claim 1, wherein:
  a recorded sessions data feeder is configured for flowing recorded sessions data (RSD) into an adversarial reinforcement learner ARLG (120); and
  said ARLG (120) is configured for generating MSVs, thereby fine-tuning session specific decisions.

6. The system according to claim 1, wherein said MSVs are small-data-structures of less than 10 dimensions vector; each dimension is comprised of a subset of state-identifiers.

7. The system for orchestration of at least one first swarm according to claim 1, wherein said SRO (353) communicates (361) with a recorder (362), hence updating status (363) of said swarm of objects [1 . . . n] and providing a database for further analysis.

8. The system for orchestration of at least one first swarm according to claim 1, wherein:
  said method for configuring of said set of MLRTS (355) for real-time communicating (356) said SRO (353) further comprises:
    by means of said SR (160), delivering (175a) to recorders (180) evidential data items of operations research, selected from the group consisting of real-time feeds, inputs and outputs of the swarm runner and optimizer, orders transmitted, and respective executions, for system's future use; and
    by means of said recorders (180) delivering (181) said evidential data items to said RDBMS (100) for further storing of said recorded information; then Providing (121) an Adversarial Reinforcement Learning Generator ARLG (120) data selected from the group consisting hereto recorded data, manually fed data, and ingested data; and,
  said step of delivering (175a) to recorders (180) evidential data items of operations research occurs in parallel with said step of delivering (175b) to said RDBMS (100) said data items of operations research.

9. A method for orchestration of swarms, comprising:
providing:
  intercommunicated offline subsystem 3OL for precomputation of swarm response functions to be operated in real time; and,
  one or more real-time 3RT subsystems;
within said offline subsystem 3OL, communicating (301) with a plurality of application programming interface (APIs);
by a communication module (300);
storing ingested data by a timely ingestions and verifications module (TIV, 302);
processing said ingested data (303) by a pre-computation solver (PS, 304);

said processing said ingested data (303) by said PS (304), is provided at least once, including at a time prior to real-time operation, in intercommunicating (305) with multiple real-time solvers MLRTS (355);

identifying a swarm of objects [1 . . . n];

continuously communicating (359) with said each object [1 . . . n] by a router (358);

operating by a predefined protocol, and intermittently communicating (360) with said router (358);

configuring a swarm runner and optimizer (SRO, 353) to continuously communicating a Swarm Generator (SG, 351) said router (358), further continuously communicating (352) with said swarm runner and optimizer (353);

intercommunicating (354) at time said protocol is evoked, said SRO (353) with a set of MLRTS (355);

feedbacking (356) SRO (353) said set of MLRTS (355) upon completion of required computational tasks, and within a predefined timeline, thereby optimizing said swarm over a predetermined strategy;

intercommunicating (357) said optimization with said router (358), thereby intercommunicating (359) with relevant objects [1 . . . n]; and, said relevant objects [1 . . . n] acknowledging the execution of order, namely, communicating (360) via router (358) with said SRO (353) upon completion of said intercommunication (359);

wherein said real-time communication is provided by means of an instantaneous measure of state variables generating module (IMSV, 152), whilst computing and delivering (153) said IMSV; said method further comprising steps of verifying whether said IMSV is in the parameter range that underlies the subset of sessions' functions that are stored (107) by RDBMS (100);

if IMSV not in range, triggering (154) a round of pre-computation with an extended range of underlying IMSV, that is consistent with the most recent measure of IMSV, with appropriate tolerance;

if IMSV is in range, interpolating across objects' specific space by means of said Real-time functions generator RTMG, (163), thereby obtaining said real-time instantaneous function (164) for each object [1 . . . n];

interpolating across objects' specific space, by means of RTMG (163), and at a command (161) of said swarm runner SR (160), thereby generating (164) said real-time instantaneous function for each object, respectively;

generating (166) gravity matrices and dominance graphs given real-time instantaneous functions and real-time signals by means of a dominance graph generator DGG (165);

generating progression moments, by means of moments generator MG (167) and selecting a member of the group consisting of expected progression, covariance matrix, skew-model matrices, and kurtosis-model matrices, thereby providing (168) arrays of expected progression, risk model, including covariance matrix, skew model, further including a set of matrices, kurtosis model, also including a set of matrices;

providing (159) said SR (160) with inputs required for optimizations, by means of said RDBMS (100), and selecting the same from the group consisting of 'strategy & constrains', minimal set of variables (MSV), schedule of operation, costs, and fees;

configuring and operating said SR (160) for executing the following:

commanding (161) a timely operation of said RTMG (163);

requiring (161) swarm objects' moments by means of said SR (160);

then optimizing over instantaneous swarm, according to said provisioned strategy and said set of constraints;

post-optimizing changes in swarm by providing said real time signal router RTSR (170) orders (169);

configuring and operating said RTSR (170) for executing the following:

routing (171) said orders to their respective objects (172); and configuring and operating said objects (172) for executing the following:

accepting order (171);

executing orders by each and every swarm object [1 . . . n], subject to a timeout;

responding (173) said RTSR (170) by returning execution details; if one of the following is held true: (i) execution or (ii) a time out (cancelation), by means of said objects (172);

delivering (173) acknowledged-orders thereby record-keeping data, for either or both: next round of optimization by means of SR (160); and offline analyzing and adversarial learning (120);

continuously signaling (149) to a Real time signal Router RTSR (150) heartbeats and outflow of parameters, selected from the group consisting of position, and current status, by means of said objects [1 . . . n];

feeding and streaming an instantaneous real time unified swarm (151) as an input for decision making generators, selected from the group consisting of said IMSV Generator (152) and said DGG (165), by means of said RTSR (150);

delivering (175*b*) to RDBMS (100) said data items of operations research, selected from the group consisting of real-time feeds, inputs and outputs of the swarm runner and optimizer, orders transmitted, and respective executions; then providing (121) said ARLG(120) data selected from the group consisting hereto recorded data, manually fed data, and ingested data;

providing learning and quantitative analysis (LQA) by means of said ARLG (120), configured for; selecting the same from the group consisting of back-testing results, training results, and thereby providing respective rules for establishing session's MSVs;

applying offline (12) at least one member of the group consisting of:

performing back testing, thereby revealing optimal strategies;

performing adversarial learning and training, thereby obtaining session dependent optimal minimal set of variables MSV; and providing Session dependent MSV, outflowing (122) said learning and quantitative analysis LQA to said RDBMS (100), still by means of said ARLG (120), precomputing and preparing (10) one or more real-time operations session (11); comprising:

ingesting data (101) by means of a communicator APIs (CAPI, 300); storing and delivering (303) the same to a communication module (300) by means of a Timely Ingestions and Verifications module TIVM (302); and delivering (102) to RDBMS (100) ingested parameters, thereby facilitating the initiation of a session; then building records for objects [1 . . . n], and creating all session's data records;

providing (103) required session's records and current status to said PS (304), by means of said RDBMS (100);

preparing session underling events space [$l^\infty$] for each and every object in the swarm data set; and sessions' functions-space [$L^\infty$] for each and every object in the swarm dataset by means of a model-based reinforcement learning generator MBRLG (106); then storing (107) the same in RDBMS 100;

triggering (105*a*) operation of MBRLG (106) by means of real-time triggering module RTTM (104), and at time one of the following triggers is held true:
  time session precomputation is due according to a schedule defined by swarm's system administrator;
  IMSV (153) is out of range;
  swarm composition updates;
  at least one object (n) updates;
  system administrator manually or otherwise administrator's approved overrides;
in parallel and simultaneously,
freezing (105*b*) said swarm; and,
unfreezing the swarm at time both of the following is held true: operation of MBRLG (106) comes to a successful end; and said real time signal router (170) receives from said swarm runner.

10. The method according to claim 9, further comprising configuring said PS (304) for preparing session underling events space [$l^\infty$] for each and every object [1 . . . n] in the swarm dataset; and preparing sessions' function-space [$L^\infty$] for each and every object [1 . . . n] in the swarm dataset.

11. The method according to claim 9, further comprising configuring said communication (305) for delivering sessions functions space to a multi-layer real time solvers MLRTS (355); and kicking-off said real-time sub-system O3RT upon completing said step of delivering.

12. The method according to claim 9, further comprising configuring said MLRTS (355) for communicating (356) in real-time with said SRO (353).

13. The method according to claim 9, configured for orchestrating at least one first swarm and simultaneously, orchestrating at least one second swarm.

14. The method according to claim 9, further comprising intercommunicating model-based data precomputed by an offline subsystem 3OL with a real-time 3RT subsystem.

15. The method according to claim 9, further comprising:
  feeding recorded sessions data (RSD) into the adversarial reinforcement learner ARLG (120); and
  generating MSVs by means of said ARLG (120) thereby fine-tuning session specific decisions.

16. The method according to claim 9, wherein said MSVs are small-data-structures of less than 10 dimensions vector; each dimension is comprised of a subset of state-identifiers.

17. The method according to claim 9, further comprising communicating with at least one user by means of delivering protocols.

18. The method according to claim 9, further comprising intercommunicating (361) said SRO (353) with a recorder (362) thereby updating status (363) of said swarm of objects [1 . . . n]; and providing a database for further analysis.

19. The method according to claim 9, further comprising delivering (175*a*) to recorders (180) evidential data items of operations research, selected from the group consisting of real-time feeds, inputs and outputs of the swarm runner and optimizer, orders transmitted, and respective executions, for system's future use, by means of said SR (160).

20. The method according to claim 9, further comprising delivering (181) said evidential data items to said RDBMS (100) for further storing of said recorded information, by means of said recorders (180); then providing (121) an adversarial reinforcement learning generator ARLG (120) data selected from the group consisting hereto recorded data, manually fed data, and ingested data.

\* \* \* \* \*